(12) United States Patent
Basu et al.

(10) Patent No.: US 11,436,945 B2
(45) Date of Patent: Sep. 6, 2022

(54) MILLIFLUIDIC SYSTEM FOR THROMBOSIS ANALYSIS UNDER PATIENT-SPECIFIC PHYSIOLOGICAL CONDITIONS

(71) Applicant: The University of Chicago, Chicago, IL (US)

(72) Inventors: Anindita Basu, Chicago, IL (US); Mary Hammes, Chicago, IL (US); Andres Moya-Rodriguez, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 46 days.

(21) Appl. No.: 16/947,882

(22) Filed: Aug. 21, 2020

(65) Prior Publication Data

US 2021/0056867 A1 Feb. 25, 2021

Related U.S. Application Data

(60) Provisional application No. 62/890,642, filed on Aug. 23, 2019.

(51) Int. Cl.
  *G09B 23/30* (2006.01)
  *G09B 23/28* (2006.01)

(52) U.S. Cl.
  CPC ......... *G09B 23/306* (2013.01); *G09B 23/286* (2013.01); *G09B 23/303* (2013.01)

(58) Field of Classification Search
  CPC ...... G09B 23/28; G09B 23/286; G09B 23/30; G09B 23/303; G09B 23/306
  See application file for complete search history.

(56) References Cited

U.S. PATENT DOCUMENTS

| 2019/0103040 A1* | 4/2019 | Kerins ................ G09B 23/34 |
| 2020/0090550 A1* | 3/2020 | Reeh ................. G09B 23/303 |
| 2021/0052328 A1* | 2/2021 | Sengupta .............. B33Y 50/02 |
| 2021/0201702 A1* | 7/2021 | Mali .................... B33Y 80/00 |

OTHER PUBLICATIONS

Akherat et al., "A predictive framework to elucidate venous stenosis: CFD & shape optimization" *Comput Methods Appl Mech Engrg.* 2017, 321, 46-69.
Boghosian et al., "Hemodynamics in the cephalic arch of a brachiocephalic fistula" *Med Eng Phys.* 2014, 36(7), 822-830.
Corpataux et al., "Low-pressure environment and remodelling of the forearm vein in Brescia-Cimino haemodialysis access" *Nephrol Dial Transplant* 2002, 17, 1057-1062.
Costa et al., "Mimicking arterial thrombosis in a 3D-printed microfluidic in vitro vascular model based on computed tomography angiography data" *Lab Chip* 2017, 17, 2785-2792.
(Continued)

*Primary Examiner* — Timothy A Musselman
(74) *Attorney, Agent, or Firm* — Norton Rose Fulbright US LLP

(57) ABSTRACT

The present disclosure includes millifluidic cephalic arch (mCA) device having a patient-specific vessel that includes an outer surface; an inner surface that defines a vessel lumen extending through the patient-specific vessel and configured to correspond to a patient's Cephalic vein, and a curved section.

20 Claims, 28 Drawing Sheets

(56) References Cited

OTHER PUBLICATIONS

DeStefano et al., "Real-time quantification of endothelial response to shear stress and vascular modulators" *Integr. Biol.* 2017, 9(4), 362-374.
Ene-lordache, Bogdan and Andrea Remuzzi. "Disturbed flow in radial-cephalic arteriovenous fistulae for haemodialysis: low and oscillating shear stress locates the sites of stenosis" *Nephrol Dial Transplant* 2012, 27, 358-368.
Hammes et al., "Increased Inlet Blood Flow Velocity Predicts Low Wall Shear Stress in the Cephalic Arch of Patients with Brachiocephalic Fistula Access" PLOS ONE 2016, 18 pages.
Quanyu et al., "Simulation Analysis of Blood Flow in Arteries of the Human Arm" *Biomed Eng* (Singapore) 2017, 29(4), 17 pages.
Vrana et al., "Endothelialization of PVA/gelatin cryogels for vascular tissue engineering: Effect of disturbed shear stress conditions" *J Biomed Mater Res A*. 2010, 94(4), 1080-90.
Wang et al., "Effect of Paricalcitol on Left Ventricular Mass and Function in CKD—The OPERA Trial" *J Am Soc Nephrol* 2014, 25, 175-186.
Yau et al., "Endothelial cell control of thrombosis" BMC Cardiovascular Disorders 2015, 15(130), 11 pages.

\* cited by examiner

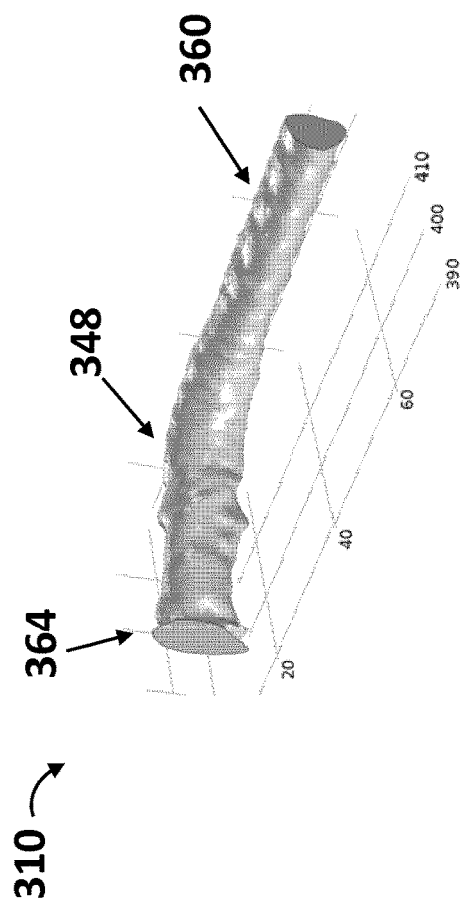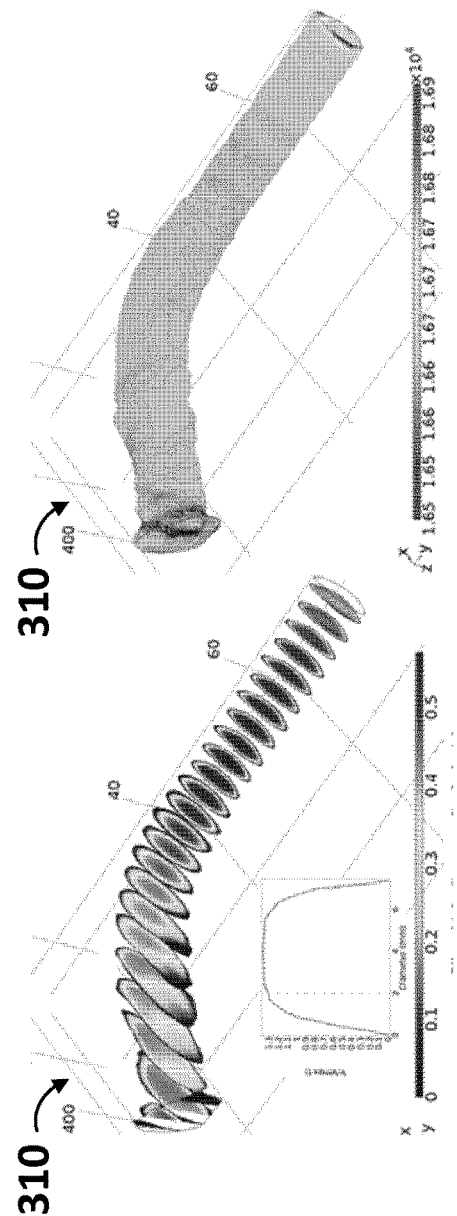

506

MILLIFLUIDIC SYSTEM FOR THROMBOSIS ANALYSIS UNDER PATIENT-SPECIFIC PHYSIOLOGICAL CONDITIONS

CROSS-REFERENCE FOR RELATED APPLICATIONS

This application claims the benefit of priority of U.S. Provisional Patent Application No. 62/890,642 filed Aug. 23, 2019, which is hereby incorporated by reference in its entirety.

FIELD OF INVENTION

The present invention relates generally to apparatuses and methods for predicting blood clot formation, and more specifically, but not by way of limitation, to patient specific millifluidic models that may be suitable for predicting a high-risk location of thrombosis formation in the Cephalic arch.

BACKGROUND

End-Stage renal disease (ESRD) occurs as your kidneys are no longer able to filter waste products as they should to meet your body's needs. With end-stage renal disease, you need dialysis or a kidney transplant to stay alive. Because of the long wait times for kidney transplants, dialysis is often the only option for patients with ESRD. Hemodialysis is a form of dialysis in which an artificial kidney (hemodialyzer) is used to remove waste, extra chemicals and fluid from your blood. To get your blood into the artificial kidney, the doctor needs to make an access (entrance) into your blood vessels.

Vascular access in ESRD patients for hemodialysis treatment is routinely and best provided by an arteriovenous fistula (AVF), the most popular being the brachiocephalic fistula (BCF). Vascular access to the BCF is almost exclusively limited to the Cephalic vein. ESRD and hemodialysis often lead to complications with thrombus formation such as an increased risk of deep vein thrombosis, pulmonary emboli, and frequently, vascular access thrombosis. The failure rate of AVF is in hemodialysis is high and often is due to thrombosis. Unfortunately, thrombosis of an AVF, particularly in the cephalic vein arch for BCF, leads to access failure. In turn, failed access leads to missed hemodialysis sessions causing electrolyte imbalance, hospitalizations, radiologic interventions, surgical revision and contributes to the morbidity, mortality and enormous financial burden of providing hemodialysis for ESRD patients. Currently, traditional therapies such as anticoagulants and antiplatelet drugs have been unsuccessful in treatment and prevention of venous thrombosis in AVFs.

Similarly, there is no a clear understanding of the hemodynamics influence on the clot formation in an AVF cephalic arch context. Generally, research of thrombus formation in an AVF cephalic arch is limited to two-dimensional models, such as venograms or other computational models, due to risks associated with testing the AVF on an actual patient.

SUMMARY

The present disclosure is generally related to systems, devices, and apparatuses for modeling thrombus formation in an AVF, such as a brachiocephalic fistula (BCF). Some configurations of the present invention include a millifluidic Cephalic Arch (mCA) system for three-dimensional modeling of hemodynamical, geometrical, and endothelial factors on thrombus formation in an AVF. In some configurations, the mCA system includes a millifluidic cephalic arch (mCA) device comprising a patient-specific vessel extending from a proximal end to a distal end to model the geometrical complexities of a patient's AVF. The vessel may include an inner surface defining a vessel lumen extending through the vessel from the proximal end to the distal end, the inner surface configured to correspond to a patient's Cephalic vein at a first predetermined time. In some such configurations, inner surface may comprise a curved section that is nearer the vessel distal end than the vessel proximal end to simulate a Cephalic arch of the patient. In some configurations, vessel lumen defines a a first section including an inlet, a second section including an outlet, and a curved section positioned between the first section and the second section. The c curved section may be nearer the vessel distal end than the vessel proximal end. In some configurations, the second section includes a length that is less than or equal to the first section. In some configurations, the mCA system includes a fluid source configured to be in fluid communication with the mCA device to deliver fluid to the proximal end of the vessel based on patient-specific hemodynamics. Some configurations further comprise, a control system that includes, one or more sensors configured to detect a plurality of parameters of the inner surface of the vessel and the fluid flowing through the mCA device, an imaging device configured to capture at least a portion of the inner surface while the fluid is flowing through the mCA device under pathophysiological parameters such as velocity, viscosity, pulsatility, and a controller coupled to the one or more sensors and the imaging device, the controller configured to analyze the plurality of parameters.

In some configurations, the inner surface of the mCA device comprises endothelium to accurately measure the impact the fluid flowing through the vessel has on thrombus formation. For example, the endothelium can comprise human umbilical vein endothelial cells to mimic a blood vessel of a patient. In some of the foregoing configurations, one or more sensors and/or an imaging device are configured to detect a plurality of parameters including geometric parameters, homodynamic parameters, and endothelial parameters. In some such configurations, the geometric parameters comprise: a vessel lumen diameter, an angle of curved section, and length of vessel; the homodynamic parameters comprise: physical properties of the fluid, pulsatility, fluid pressure, fluid flow rate, fluid velocity, Doppler flow velocity, Reynolds number, inner surface shear stress, and spatial identification of recirculation pools; and the endothelial parameters comprise von Willebrand factor (VWF), P-selectin, cell viability, and nitric oxide levels. In some configurations, the controller is configured analyze geometric, homodynamic, and endothelial parameters to determine a location of the inner surface with a highest risk of contributing to thrombosis. In some such configurations, the control system may identify one or more relevant factors, from the geometric parameters, homodynamic parameters, and endothelial parameters that contribute to the thrombus formation. In some of the foregoing configurations, the fluid comprises a blood-mimicking fluid (BMF) or blood.

In some configurations, the mCA system includes a second mCA device. In some such configurations, the second mCA device includes a second patient-specific vessel extending from a second proximal end to a second distal end. In some configurations, the vessel includes a second outer surface, a second inner surface that defines a second vessel lumen extending through the second vessel from the second proximal end to the second distal end. In such configurations, the second inner surface corresponds to the patient's Cephalic vein after second predetermined time. In some configurations, the second mCA device includes a second curved section that is nearer the second vessel distal end than the second vessel proximal end.

Some configurations of the present invention include a mCA device comprising a patient-specific vessel extending from a proximal end to a distal end. In some such configurations, the vessel includes an inner surface defining a vessel lumen extending through the vessel from the proximal end to the distal end, the inner surface configured to correspond to a patient's Cephalic vein and a curved section that is nearer the vessel distal end than the vessel proximal end. In some configurations, the inner surface of the mCA device comprises endothelium. In such configurations, the endothelium may include or correspond to human umbilical vein endothelial cells.

In some of the foregoing configurations, the mCA device includes an inlet tube coupled to the proximal end of the vessel, an outlet tube coupled to the distal end of the vessel, and a fluid source coupled to the inlet tube and the outlet tube, the fluid source configured to supply a fluid from the proximal end. In some such configurations, the fluid comprises a fluorescent material. In some of the present configurations, the vessel comprises an optically transparent polymer. In some configurations, the inner surface is customized as a function of preoperative imaging of the patient's Cephalic vein. In some of the foregoing devices, the curved section defines an angle that is between 65 and 155 degrees. In some configurations, the curved section defines a normalized radius of curvature that is between 1 and 15.

Some configurations of the present invention include a method of using the mCA system. Some such configurations, include a method of forming a patient-specific mCA device. In some configurations, the method includes preparing a three-dimensional venous cephalic arch model from patient-specific imaging data and fabricating a three-dimensional cephalic arch mold. Some such methods further include endothelializing the three-dimensional cephalic arch model. In some methods, the three-dimensional cephalic arch mold defines a venous conduit that corresponds to the three-dimensional venous cephalic arch model. In some configurations, the venous conduit includes an inlet and an outlet, the inlet configured to be coupled to a fluid source to deliver fluid through the venous conduit. Some methods may include using the formed patient-specific mCA device to measure flow parameters, identify high-risk regions, and/or create patient-specific dialysis treatments.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any configuration of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

FIG. 9A is an example of a digital 3D Cephalic Arch (CA) model.

FIGS. 9B-9C are a velocity profile and wall pressure profile, respectively, of the digital 3D CA model of FIG. 9A according to patient specific flow parameters.

FIGS. 10B-9C show a velocity profile and a wall pressure profile, respectively, of the digital 3D CA model of FIG. 10A according to patient specific flow parameters.

FIG. 14A is an original digital 3D CA model that was used to fabricate the printed mCA device of FIGS. 12A-B.

DETAILED DESCRIPTION

Figure 1:
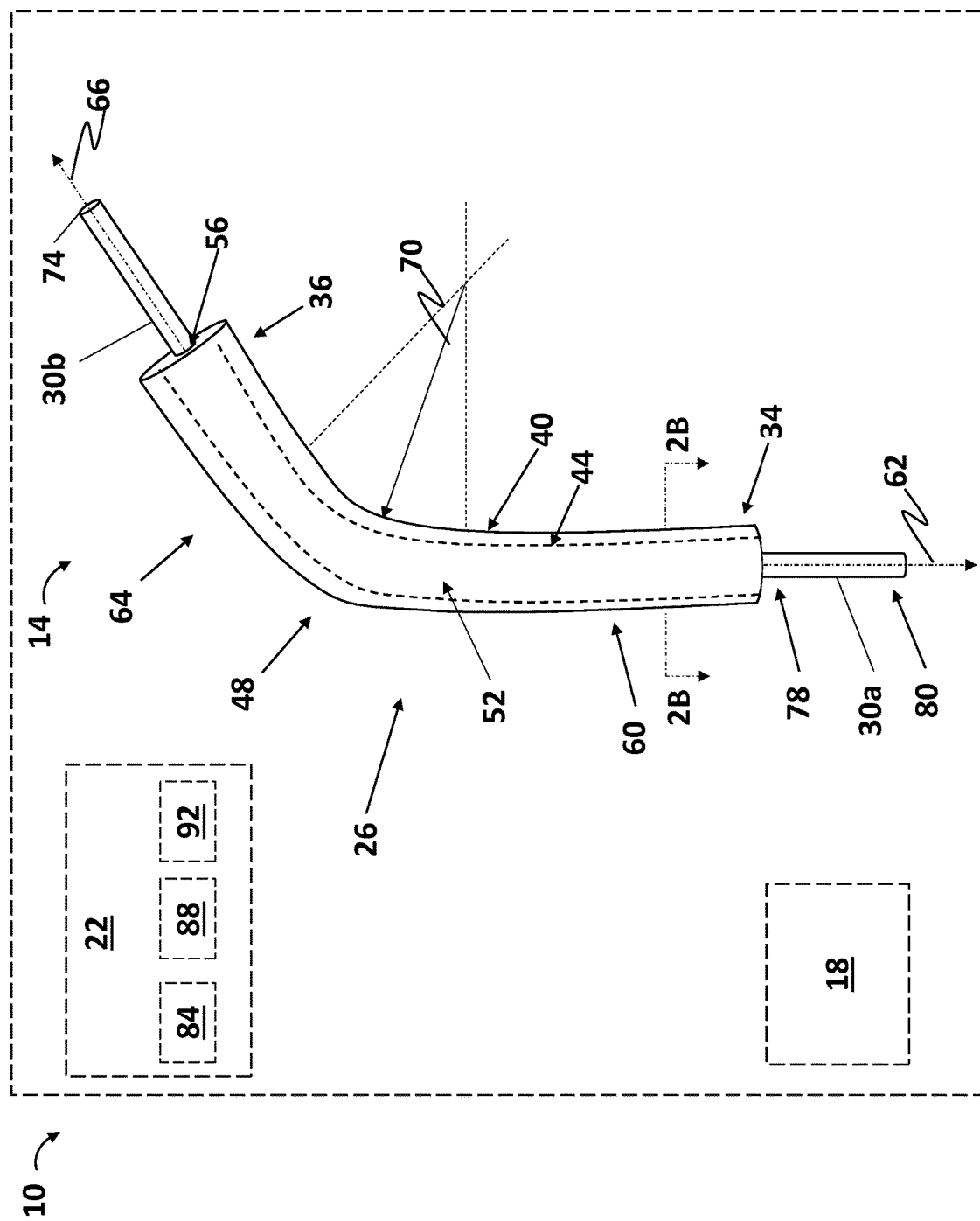
FIG. 1 is a diagram of an example of a first configuration of a millifluidic Cephalic Arch (mCA) system.

Referring to FIG. 1, an example of a millifluidic Cephalic Arch (mCA) system is shown and generally designated 10. In some configurations, mCA system 10 may be used to assess and target thrombus formation under heterogeneous patient-specific physiological conditions. Specifically, mCA system 10 is used to analyze venous thrombosis of arterio-venous fistulas in patients with End-Stage Renal Disease (ESRD). In the depicted configuration, mCA system 10 includes a millifluidic Cephalic Arch (mCA) device 14, a fluid source 18, and a control system 22. Each component of mCA system 10 (e.g., 14, 18, 22) may be coupled to one or more other component(s) of the mCA system.

In the depicted configurations, mCA device 14 includes a vessel 26 and one or more tubes 30. In some configurations, vessel 26 extends from a first end 34 to a second end 36 and comprises an outer surface 40, an inner surface 44, and a curved section 48. As shown, first end 34 (e.g., proximal end) is opposite second end 36 (e.g., distal end). In some configurations first end 34 is associated with an inlet of vessel 26 and second end 36 is associated with an outlet of the vessel. In the depicted configuration, outer surface 40 and inner surface 44 each extend from first end 34 to second end 36. As shown, outer surface 40 may define an exterior of vessel 26 and inner surface 44 defines a vessel lumen 52 extending though vessel 26 from first end 34 to second end 36. For example, vessel lumen 52 may extend from a first opening (e.g., 56) defined by inner surface 44 at first end 34 to a second opening (e.g., 56) defined by inner surface 44 at second end 36. In other configurations, vessel 26 may comprise any suitable structure such that inner surface 44 may define vessel lumen 52. For example, outer surface 40 may be comprise a block of transparent material (e.g., PDMS) and having a negative mold (e.g., 52) defined by an inner surface (e.g. 44) that is configured to mimic blood vessel geometric properties of a blood vessel (e.g., cephalic vein).

Curved section 48 may comprise a portion of vessel 26 (e.g., inner surface 44) that is arcuate. In some configurations, curved section 48 may be positioned nearer second end 36 than first end 34; however, in other configurations, curved section 48 may comprise any portion of vessel 26 between outer first end 34 and second end 36. In some configurations, curved section 48 connects a first portion 60 of vessel 26 extending in a first direction 62 to a second portion 64 of the vessel that extends in a second direction 66. For example, first direction 62 may correspond to a longitudinal axis of vessel lumen 52 along first portion 60 and second direction 66 may correspond to the longitudinal axis of the vessel lumen 52 along second portion 64. As shown, first direction 62 is angularly disposed relative to second direction 66 by an angle 70 that is greater than or equal to any one of, or between any two of: 50, 60, 65, 70, 80, 90, 100, 110, 120, 130, 140, 150, 155, 160, or 165 degrees. In some configurations, angle 70 may comprise a normalized radius of curvature, that is greater than or equal to any one of, or between any two of: 1, 2, 3, 4, 5, 6, 7, 8, 9, 10, 11, 12, 13, 14, or 15. Normalized radius of curvature may be defined as the radius of curvature of curved section 48 over vein diameter (e.g., inner diameter 104 at curved section 48).

In the depicted configuration, tubes 30 comprise a channel 74 that extends from a first end 78 of the tube to a second end 80 of the tube. In some configurations, tubes 30 may be coupled to first end 34 and/or second end 36 of vessel 26. As shown, a tube (e.g., 30) may be coupled to vessel 26 at first end 34 and second end 36. For example, a first end (e.g., 78) of a first tube (e.g., inlet tube 30*a*) is connected to first end 34 of vessel 26 and a first end (e.g., 78) of a second tube (e.g., outlet tube 30*b*) is connected to second end 36 of the vessel. In some configurations, inlet tube (e.g., 30*a*) is configured to supply a fluid to vessel lumen 52 at first end 34 and outlet tube (e.g., 30*b*) is configured to deliver the fluid away from the vessel lumen at second end 36. In some configurations, tube(s) 30 are in fluid communication with vessel 26 to define at least a portion of the flow path of mCA device 14 or mCA system 10. To illustrate, tube(s) 30 are positioned such that channel(s) 74 of each tube extends substantially along a longitudinal axis (e.g., 62 or 66) of vessel 26 to connect the channel to vessel lumen 52. The mCA device 14 can be utilized to better predict venous stenosis and thrombosis associated with dialysis in the cephalic vein compared to two-dimensional models that traditionally fail to account for blood pressure or pulsatility parameters.

Fluid source 18 may be coupled to mCA device 14. In some configurations, fluid source 18 is in fluid communication with mCA device 14 and configured to deliver a fluid to vessel 26. As shown, fluid source 18 may be coupled to an inlet tube (e.g., 30*a*) to deliver fluid through the tube to vessel lumen 52. In other configurations, fluid source 18 may be coupled directly to first end 34 (e.g., at opening 56) to deliver fluid to vessel lumen 52. Additionally, or alternatively, fluid source 18 maybe coupled to an outlet tube (e.g., 30*b*) to deliver fluid from vessel lumen to the tube. In other configurations, fluid source 18 may be coupled directly to second end 36 (e.g., at opening 56) to deliver fluid from vessel lumen 52 to the fluid source. Fluid source 18 may be configured (e.g., via control system 22) to deliver turbulent or laminar flow of fluid through vessel lumen 52. In some configurations, fluid source 18 may deliver fluid through vessel 26 in a pulsed (e.g., sinusoidal or sawtooth periodic waves) or steady manner.

In some configurations, fluid source 18 may be coupled both an inlet (e.g., 30*a* or 34) of vessel 26 and an outlet (e.g., 30*b* or 36) of the vessel to define a recirculating flow path. To illustrate, mCA system 10 may define a closed loop fluidic circuit for recirculating fluid through mCA device 14. For example, a small volume of liquid (e.g., between 10 and 25 mL) may be circulated through mCA device 14 by fluid source 18 to allow liquid (e.g., patient blood) to be tested directly on the mCA device with IRB approval. In some configurations, fluid source 18 may comprise a single reservoir or a plurality of reservoirs that are in fluid communication with each other to recirculate the fluid through mCA device 14. For example, an inlet (e.g., 30*a* or 34) of vessel 26 may be connected to a first reservoir and an outlet (e.g., 30*b* or 36) of the vessel may be connected to a second reservoir to define a flow path from the first reservoir to the second reservoir. Fluid device 18 may comprise any suitable microfluidic pressure manifold. In some configurations, fluid source 18 may comprise a pump (e.g., blood pump), such as but not limited to, a recirculation pump, peristaltic pump, syringe pump, centrifugal pump, positive-displacement pump (e.g., bulk-handling or metering pumps), or the like.

Control system 22 may be coupled to mCA device 14 and/or fluid source 18. In some configurations, control system 22 (e.g., pressure controller) may be configured to initiate operations of mCA system 10 (e.g., control flow of fluid). Additionally, or alternatively, control system may be configured to collect, calculate, and/or analyze data captured, or stored within, mCA system 10. In the depicted configuration, control system 22 comprises a controller 84 (e.g., control device or control unit), one or more sensor(s) 88, and an imaging device 92. In some configurations, control system 22 may be electrically coupled to components of mCA system 10 (e.g., 14, 18) and configured to operate the mCA system to control flow of fluid between fluid source 18 and mCA device 14 (as described in greater detail with reference to FIG. 3).

Sensor(s) 88 may be configured to detect one or more parameters and to provide data indicating the one or more conditions to controller 84. For example, sensor(s) 88 may detect geometric parameters, hemodynamic parameters, and endothelial parameters of mCA system 10. In some configurations, the geometric parameters may comprise dimensions of vessel lumen 52 (e.g., length, diameter, surface area, or the like), dimensions of vessel 26 (e.g., length and transverse dimension of 26, 48, 60, and 64, angle 70, or the like), and/or dimensions of tube(s) 30. In some configurations, hemodynamic parameters may comprise physical properties of the fluid (e.g., density, viscosity, temperature, pressure, specific weight, specific volume, specific gravity, or the like), surface tension, pulsatility, fluid pressure, fluid flow rate, fluid velocity, Doppler flow velocity, Reynolds number, stresses on fluid (e.g., shear velocity, shear stress, shear rate, yield stress, and the like), stresses on inner surface 44 (e.g., inner surface shear stress), spatial identification of recirculation pools, and the like. In some components, sensor(s) 88 may comprise flow meters, MEMS sensor, in-line fluidic sensor, pressure sensor, temperature sensor, mass flow sensors, ultrasonic sensors, level sensor, Infrared sensor, accelerometer, humidity sensor, or the like.

Imaging device 92 may be configured to capture at least a portion of inner surface 44 while the fluid is flowing through mCA device 14. For example, imaging device 92 may be configured to capture images, or image data, of fluid within different regions (e.g., 48, 60, 64) of vessel 26 and provide images, or date, to controller 84. In some configurations, imaging device 92 may be configured to provide intravascular ultrasound (IVUS), a venogram, epifluorescence or confocal microscopy of vessel lumen 52. To illustrate, imaging device 92 (e.g., via real-time optical microscopy) may be configured to detect hemodynamic parameters and/or endothelial parameters of mCA system 10. For example, in some configurations, the fluid may comprise a fluorescent material (e.g., fluorescently labelled polystyrene microbeads) that yields streamlines that can be captured by imaging device 92 along portions of vessel lumen 52. The captured images may be analyzed to determine parameters (e.g., inner surface shear stress, Reynolds number, identification of recirculation pools, or the like). In some configurations, the images may be captured continuously, or at predetermined intervals (e.g., 10 minutes). In some configurations, Imaging device 92 may comprise a light source, an ultrasound device (e.g., ultrasound catheter), x-ray device, CDC camera, CMOS camera (e.g., Hamamatsu ORCA camera), or the like. In some configurations, imaging device 92 may include a Hamamatsu ORCA Flash4.0 V3 sCMOS camera for high resolution and light sensitivity and a Photron Fastcam Mini AX200 for fast imaging (1,024×1,024 pixel resolution to 6,400 fps with reduced resolutions up to 900,000 fps. Some such configurations may comprise exposure time from 1 ms to 260 nanoseconds independent of frame rate, 12-bit dynamic range, 20 µm square pixels provide ISO 12232 Ssat certified light sensitivity of 40,000 ISO monochrome/16,000 color).

Figure 2B:
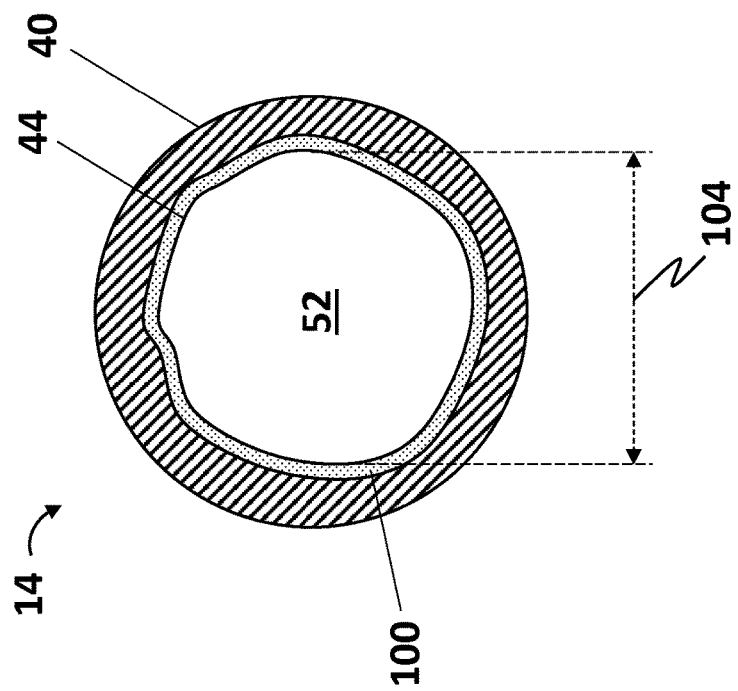
FIG. 2B is a lateral cross-sectional view of the mCA device of FIG. 1 taken about axis 2B-2B.
Figure 2A:
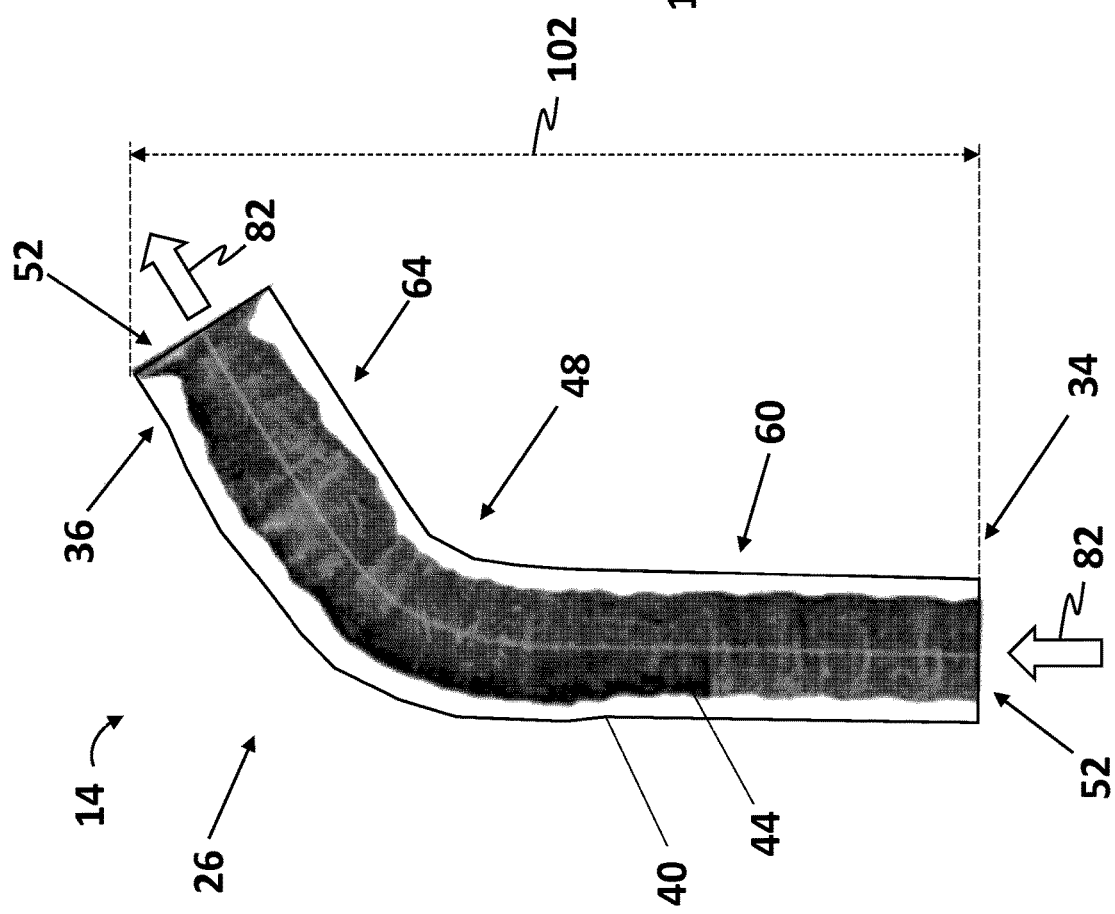
FIG. 2A is a longitudinal cross-sectional view of the mCA device of FIG. 1.

Referring now to FIG. 2A-2B, views of cross-sections of vessel 26 are shown. For example, FIG. 2A shows a longitudinal sectional view of vessel 26 taken along a plane extending though (e.g., bisecting) the mCA device 14 from first end 34 to second end 36. FIG. 2B shows a lateral sectional view of vessel 26 taken across intersection lines 2B-2B. As shown, inner surface 44 to defines a vessel lumen 52 that corresponds to a blood vessel (e.g., cephalic vein) of a patient. In other configurations, one or more layers may be disposed on inner surface 44 to define vessel lumen 52. For example, as shown in FIG. 2B, vessel 26 may comprise an endothelial layer 101 disposed on inner surface 44 to define vessel lumen 52. In some configurations, endothelial layer 101 may comprise endothelial cells (e.g., endothelium). For example, endothelial layer 101 comprises human umbilical vein endothelial cells (HUVECs). In this way, control system 22 (e.g., sensor(s) 88 and imaging device 92) may be configured to detect and analyze an endothelial state (e.g., erosion, proliferation, and/or activation) of vessel 26 based on fluid flow through inner surface 44 and vessel lumen 52.

In some configurations, vessel 26 has a length 102 that extends between first end 34 and second end 36. Length 102 may be greater than or substantially equal to any one of, or between any two of: 45, 50, 55, 60, 65, 70, 75, or 80 millimeters (mm) (e.g., between 50 and 75 mm, such as approximately 60 mm. In some configurations, inlet and outlet (e.g., 30a, 30b) may comprise a length between 10 and 20 mm. In such configurations, mCA device 14 may have a total length that is approximately between 65 and 120 mm (e.g., 90 mm).

In the depicted configuration, vessel 26 has an inner diameter 104. Inner diameter 104 may be defined by a maximum transverse dimension measured from opposing sides of inner surface 44 across a straight line. Inner diameter 148 may be may be greater than or substantially equal to any one of, or between any two of: 1, 2, 3, 4, 5, 6, 7, 8, 9, 10, 11, 12, 15, or 20 mm (e.g., between 1 and 12 mm, such as approximately 8 mm). In some configurations, length 102 and inner diameter 104 may correspond to the geometry of the cephalic vein of each patient and can be sized and dimensioned as such.

In some configurations, inner surface 44 of vessel is patient specific. For example, preoperative images (e.g., venogram and IVUS) may be taken of a blood vessel of a patient via imaging device 92 and vessel 26 may be formed to mimic the contours of the blood vessel. To illustrate, inner surface 44 may correspond to cell walls of an arterialized venous fistula (AVF) (e.g., brachiocephalic fistula) and curved section 48 may correspond to a venous arch (e.g., Cephalic arch). In some configuration, vessel 26 may comprise any optically transparent polymer (e.g., polyurethane, polyethylene, siliconized rubber, polytetrafluoroethylene (PTFE), polyethylene terephthalate, or the like) with similar mechanical properties to a human blood vessel. For example, an optically transparent polymer with non-cytotoxic and gas-permeable properties. Specifically, vessel 26 may comprise polydimethylsiloxane (PDMS) that is adjusted to simulate the mechanical properties of both healthy and diseased blood vessels. Specifically, without limitation, a 3D model of vessel lumen (e.g., 52) comprising dissolvable material (e.g., water-soluble PVA) may be formed (e.g., 3D printed) from data collected during the preoperative images of the patient's blood vessel and embedded in an elastomer (e.g., PDMS), after which the dissolvable material (e.g., PVA) will be dissolved resulting in a elastomer model having a cavity resembling the patient's blood vessel. In other configurations, any suitable method of 3D printing, or manufacturing, may be employed to create a patient-specific mCA device 14. In this way, inner surface 44 and vessel lumen 52 may be customized (e.g., shaped and sized) as a function of preoperative imaging of the patient's vein (e.g., cephalic vein).

Fluid may be pumped though patient specific mCA device (e.g., 14) to calculate one or more patient specific parameters (e.g., geometric parameters, homodynamic parameters, and endothelial parameters). For example, fluid source 18 may deliver a fluid from first end 34 of vessel 26 to second end 36 to form a flow path 82. In some configurations, flow path 82 may flow from an inlet (e.g., 30 and/or 56) at first end 34 of vessel, through the first portion 60, through the curved portion 48, through the second portion 64, to an outlet (e.g., (e.g., 30 and/or 56) at second end 36 of the vessel. In some configurations, fluid source 18 may be configured to pump fluid through mCA device 14 in a periodic manner to simulate blood flow though the patient's blood vessel. In some configurations, fluid may be a blood-mimicking fluid (BMF) or blood from the patient. For example, a Newtonian liquid with a density substantially equal to 1060 kg/m$^3$ and a dynamic viscosity substantially equal to 5 mPa*s may be employed as the blood-mimicking fluid.

Figure 3:
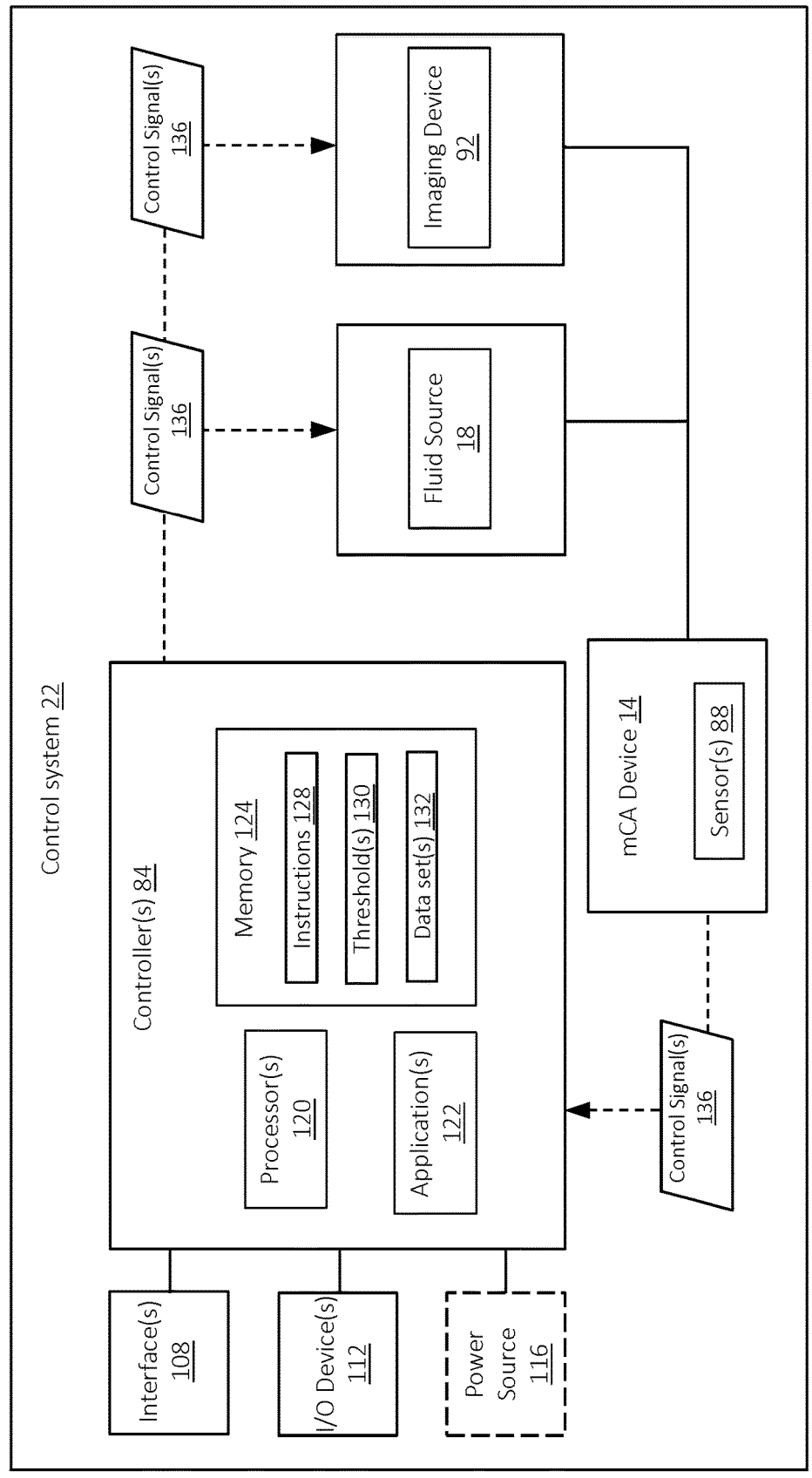
FIG. 3 is block diagram of the container of FIG. 1.

As shown in FIG. 3, control system 22 may be configured to control one or more operations of mCA system 10, such as, but not limited to, operation of fluid source 18 to achieve patient-specific flow parameters of fluid flow through vessel 26, operation of imaging device 92 and sensor(s) 88 to capture and transmit data to/from controller 84. In the depicted configuration, control system 22 may comprise one or more interface(s) 108, one or more I/O device(s) 112, and a power source 116 coupled to controller 84. In some configurations, circuitry (e.g., a PCB, wires, etc.) may connect each component of control system 22 with mCA system 10.

Controller 84 may include a processor 120 coupled to a memory 124 (e.g., a computer-readable storage device). In some configurations, controller 84 may include one or more application(s) 122 that access processor 120 and/or memory 124 to operate mCA system 10. Processor 120 may include or correspond to a microcontroller/microprocessor, a central processing unit (CPU), a field-programmable gate array (FPGA) device, an application-specific integrated circuits (ASIC), another hardware device, a firmware device, or any combination thereof. Memory 124, such as a non-transitory computer-readable storage medium, may include volatile memory devices (e.g., random access memory (RAM) devices), nonvolatile memory devices (e.g., read-only memory (ROM) devices, programmable read-only memory, and flash memory), or both. Memory 124 may be configured to store instructions 128, one or more thresholds 130, and one or more data sets 132. In some configurations, instructions 128 (e.g., control logic) may be configured to, when executed by the one or more processors 120, cause the processor(s) to perform one or more operations (e.g., actuate fluid source 18). The one or more thresholds 130 and one or more data sets 132 may be configured to cause the processor(s) to generate control signals (e.g., 136). For example, the processor(s) 120 may initiate and/or perform operations as described with reference to mCA system 10. Application(s) 122 may communicate (e.g., send and/or receive) with processor 120 and memory 124. For example, application(s) 122 may receive data from sensor(s) 136 or memory 124 (e.g., data sets 132), manipulate the data, and send a signal to processor 120 to cause the processor to output the manipulated data (e.g., via interface 108 or I/O device 112) or store the manipulated data (e.g., via memory 124). In some configurations, application(s) 122 comprises COMSOL, ABAQUS, ImageJ, Matlab, Solidworks, Auto-CAD, ANSYS, LabView, CATIA, OpenFoam, HFSS, Mathcad, combination thereof, or the like. In some configurations, controller 84 is configured to generate and send control signals 136. For example, controller 84 may generate and/or send control signals 136 responsive to receiving a signal and/or one or more user inputs via the one or more interfaces 108 and/or the one or more I/O devices 112.

Interfaces 108 may include a network interface and/or a device interface configured to be communicatively coupled to one or more other devices. For example, interfaces 108 may include a transmitter, a receiver, or a combination thereof (e.g., a transceiver), and may enable wired communication, wireless communication, or a combination thereof, such as with I/O device 112. The I/O device(s) 112 may include a touchscreen, a display device, a light emitting diode (LED), a speaker, a microphone, a camera, another I/O device, or any combination thereof, as illustrative, non-limiting examples. In some configurations, interfaces(s) 108 and/or I/O device(s) 112 may enable a wired connection to controller 84 and/or power source 116 via a port or other suitable configuration. Additionally, it is noted that in some configurations, interfaces(s) 108 and/or I/O device(s) 112 may be coupled to sensor(s) 88.

Power source 116 may be coupled to controller 84, interface(s) 108, I/O device(s) 112, fluid source 18, mCA device 14, or combination thereof. In some configurations, power source 116 may be coupled to components of control system 22 via circuitry. In some configurations, power source 116 may include a battery, capacitors, a charge storage device, etc. Although container mCA system 10 has been described as including interface(s) 108, I/O device(s) 112, controller(s) 84, and power source 116, in other configurations, the mCA system may not include one or more of interface(s) 108, I/O device(s) 112, controller(s) 84, and power source 116.

In some configurations, instructions 128 (e.g., control logic) may be configured to, when executed by the one or more processors 120, cause the processor(s) to perform one or more operations. For example, the one or more operations may include receiving a message (e.g., control signal 136, a command, or an instruction) to perform an operation and identifying the requested operation. To illustrate, the operation may include a flow operation of a fluid source (e.g., 18), a measurement operation of mCA device 14, an image control operation of imaging device 92, and predictive analysis operation of mCA system 10.

The one or more operations may also include initiating the operation based on the received message. To illustrate, initiating the operation may include generating and sending one or more control signals 136. For example, processor(s) 120 may send a control signal (e.g., 136) to fluid source 18 to increase, decrease, pulsate, or otherwise effect flow of the fluid through the mCA device 14 to perform the flow operation. In some configurations, the one or more operations may include modeling a cephalic arch of a patient (e.g., at a first and second predetermined time). For example, processor(s) 120 may send a control signal (e.g., 136) to imaging device 92 to model a vein of a patient and the imaging device may send one or more control signals 136 to the memory 124 to store data created by the imaging device.

In some configurations, controller 84, processor, and/or memory 124 may operate together to form mCA device 14. For example, controller 84 may send one or more instructions 128 to a 3D printer to create mCA device 14 (e.g., lumen 52) based on data stored in memory 124 (e.g., imaging of cephalic vein of a patient). In some configurations, the one or more operations may include measuring the flow characteristics of the fluid in mCA device 14. For example, sensor(s) 88 may send a control signal (e.g., 136) to controller 84 (e.g., memory 124) to store data (e.g., 132) created by the sensor(s). In some configurations, the data stored by controller 84 (e.g., memory 124) may be used with one or more application(s) 122 to calculate and/or determine relationships between one or more components of mCA system 10, geometrical features of mCA device 14, flow characteristics of fluid source 18, and/or combination thereof. For example, endothelial parameters (e.g., von Willebrand factor (VWF), P-selectin, cell viability, nitric oxide levels, and the like) may be calculated by control system 22. Specifically, application(s) 122 may utilize data captured by control system 22 (e.g., via sensor(s) 88 or imaging device 92) to generate one or more endothelial parameters. In at least some operations, mCA system 10 may be utilized to store diagnostic parameters (e.g., Intravascular Ultrasound or IVUS, venogram, Doppler and whole blood viscosity) of a venous conduit of an actual patient and construct a personalized millifluidic model that represent the venous conduit (e.g., cephalic arch) downstream to the AVF.

Figure 4:
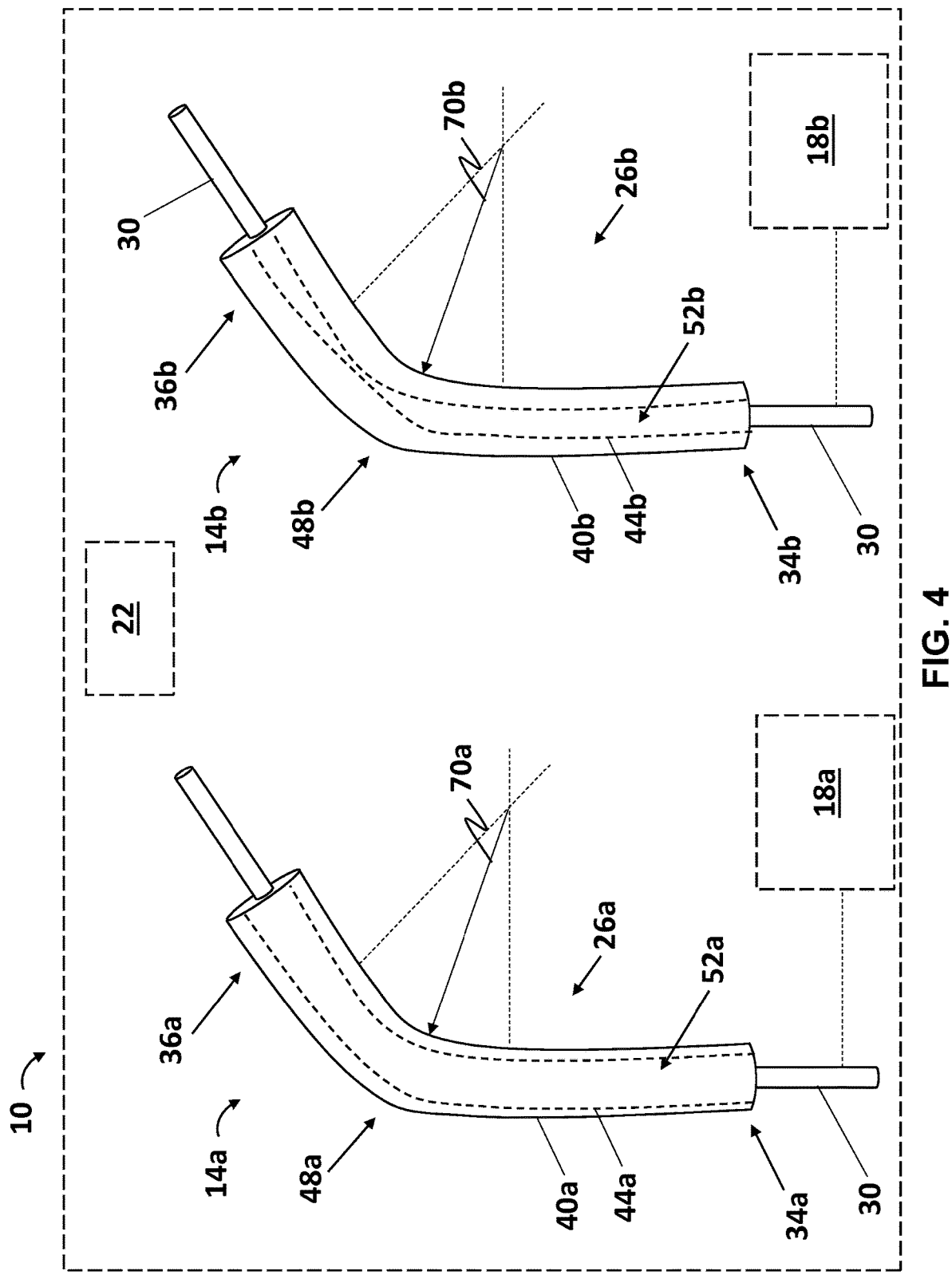
FIG. 4 is a diagram of an example of a second configuration of a mCA system.

Referring now to FIG. 4, an example of mCA system 10 is shown. In some configurations, mCA system 10 comprises a first patient-specific mCA device (e.g., 14a) corresponding to a patient's blood vessel (e.g., Cephalic vein) at a first predetermined time and a second patient-specific mCA device (e.g., 14b) corresponding to the patient's blood vessel (e.g., Cephalic vein) at a second predetermined time. In some configurations, first patient-specific mCA device (e.g., 14a) may comprise a replication of a Cephalic arch of a patient's brachiocephalic fistula (BCF) before hemodialysis and second patient-specific mCA device (e.g., 14b) may comprise a replication of the Cephalic arch of a patient's BCF after hemodialysis. For example, the first predetermined time may correspond to a time of maturation (e.g., 3 months) of the BCF. In some configurations, second predetermined time may correspond to a time (e.g., 12 months) where hemodynamic and geometric changes in the BCF are evident. For example, second predetermined time may be 12 months after BCF formation, or alternatively, 12 months after the first predetermined time. In other configurations, second predetermined time may correspond to any time after the first predetermined time.

As shown in FIG. 4, first mCA device 14a comprises a patient-specific vessel 26a that includes an outer surface 40a, an inner surface 44a that defines a vessel lumen 52a extending from first end 34a to second end 36a of the vessel 26a, and a curved section 48a having a first angle 70a. In some configurations, first mCA device is coupled to fluid source 18a. In the depicted configuration, second mCA device 14b comprises a patient-specific vessel 26b that includes an outer surface 40b, an inner surface 44b that defines a vessel lumen 52b extending from first end 34b to second end 36b of the vessel 26b, and a curved section 48b having a second angle 70b. Second mCA device 14b may be coupled to fluid source 18a that is connected to first mCA device 14a, or alternatively, the second mCA device 14b may be coupled to a distinct fluid source 18b. In some configurations, first mCA device 14a and/or second mCA device 14b may comprise one or more tube(s) 30 coupled to fluid source 18. Control system 22 may be coupled, electrically or physically, to first and second mCA devices 14a and 14b. In some configurations, control system 22 may be configured to operate first and second mCA devices 14a and 14b independently. For example, each mCA device (e.g., 14a and 14b) may be operated according to different patient-specific parameters.

Figure 5C:
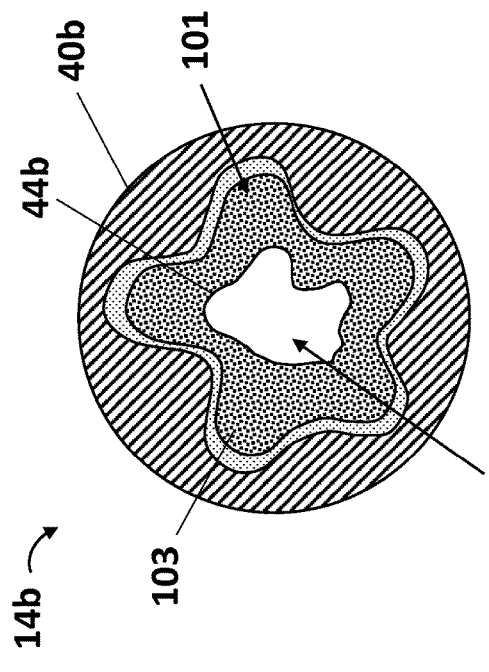
FIGS. 5C-5D illustrates lateral cross-sectional views of an example of second mCA devices.
Figure 5D:
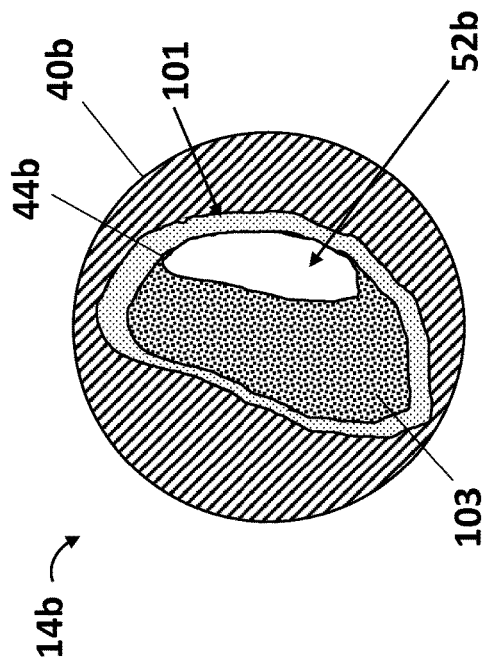
Figure 5A:
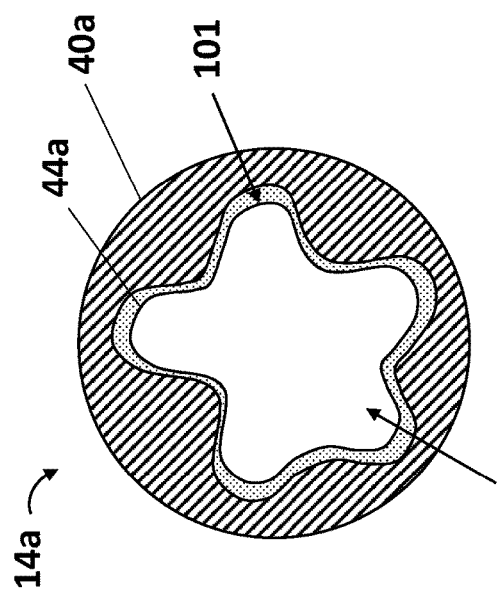
FIGS. 5A-5B illustrates lateral cross-sectional views of an example of first mCA devices.
Figure 5B:
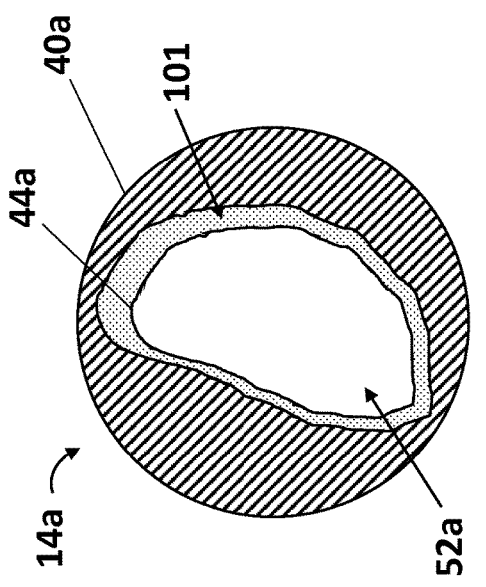

As shown in FIGS. 4 and 5A-D, vessel lumen 52 may change drastically between first predetermined time (e.g., 52a) and second predetermined time (e.g., 52b). For example, FIGS. 5A and 5B illustrate lateral sectional views of a first mCA device (e.g., 14a) where a vessel (e.g., 26) has been shaped to correspond to a blood vessel with endothelial abnormalities, which can be found in patients with ESRD. Referring to FIGS. 5C and 5D, second mCA device (e.g., 14b) may correspond to the patient's Cephalic vein at the second predetermined time. In the depicted configuration, blocking material 103 may be formed on vessel 26 or endothelial layer 101 of second mCA device 14b. Blocking material 103 may be configured to restrict the flow of fluid through vessel lumen 52. For example, blocking material 103 may decrease the area of vessel lumen 52 such that the area of the vessel lumen (e.g., 52a) at the first predetermined time is greater than the area of the vessel lumen (e.g., 52b) at the second predetermined time. In some configurations, blocking material 103 may comprise a suitable biological material (e.g., fibrin, thrombin, collagen, blood cells, platelets, or the like).

In some configurations, the second mCA device 14b may replicate a patient's vein where thrombosis has already occurred. In this case, mCA system 10 may be operated using first mCA device (e.g., 14a) to optimize the mCA system via control system 22 and identify parameters than lead to increased risk of thrombosis. For example, control system 22 may identify one or more parameters (e.g., e.g., geometric parameters, homodynamic parameters, and endothelial parameters) that contribute, individual or in conjunction with other parameter(s), to high risk of thrombosis. To illustrate, control system 22 may compare the parameter(s) (e.g., via 120 and 124) of a first mCA device (e.g., 14a FIG. 5A) corresponding to a cephalic vein of a patient who later developed thrombosis, to other first mCA devices (e.g., 14a FIG. 5B). In some configurations, control system 22 may compare mCA devices (e.g., 14) of patients who developed thrombosis to identify similar parameters. Additionally, or alternatively, control system 22 may compare a mCA device (e.g., 14a) corresponding to a patient that developed thrombosis to one other mCA device (e.g., 14) of a patient where thrombus formation did not occur to eliminate false correlations.

In another example, control system 22 may be able to adjust operation parameters (e.g., geometric parameters, homodynamic parameters, and endothelial parameters) for subsequent mCA systems. To illustrate, control system 22 (e.g., sensor(s) 88 and controller 84) may adjust flow characteristics based on blocking material 103 growth on first mCA device (e.g., 14a) after being in operation for a predetermined time; the blocking material growth on first mCA device (e.g., 14a) may then be compared to second mCA device (e.g., 14b), based on actual thrombus growth in the Cephalic arch, to determine accuracy of mCA system 10. Control system 22 may iteratively adjust operation parameters to create a more realistic model for each successive mCA device 14. In this way, the flow characteristics of each mCA device 14 can be altered to create realistic models of a patient's Cephalic arch for each stage of hemodialysis treatment. Accordingly, a more accurate analysis of cephalic arch thrombosis in ESRD patients may be achieved to identify the high risk parameters and locations associated with thrombosis nucleation. In some configurations, control system 22 can perform analysis (e.g., operations as described above) of a location (e.g., portion of 48, 60, 64) with a higher risk of contributing to thrombosis.

Figure 6:
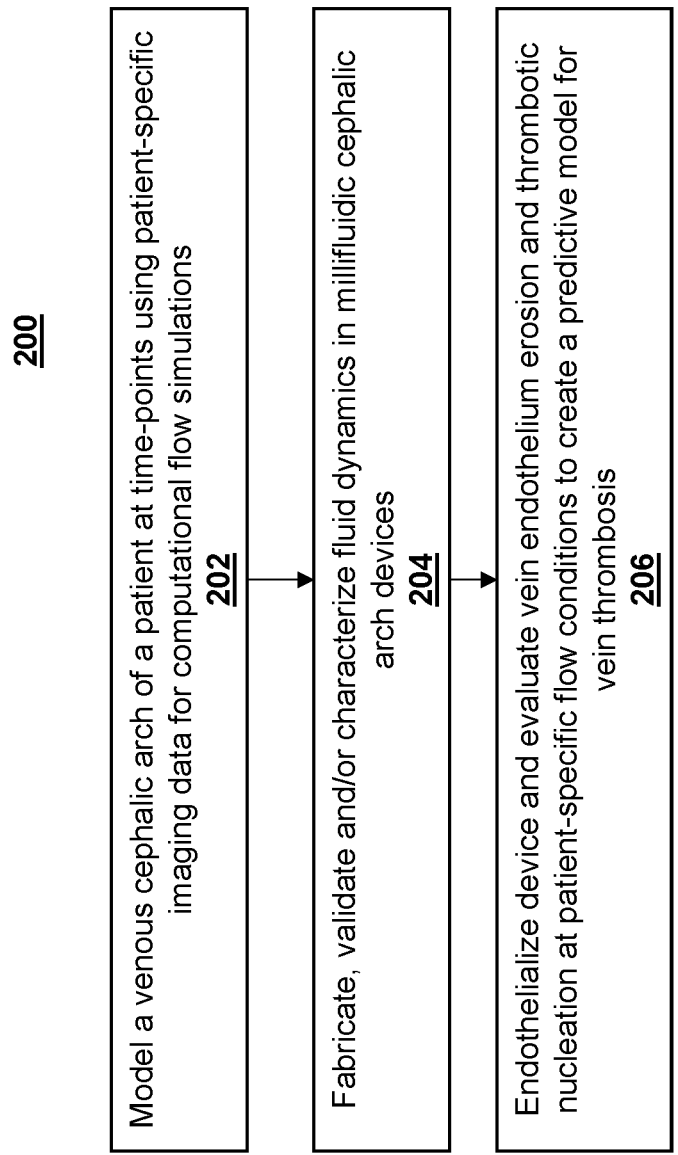
FIG. 6 illustrates a flow diagram of an example of a method of operating a container.

Referring to FIG. 6, a method 200 of using, and/or operating, mCA system 14 is shown. Method 200 includes modeling a venous cephalic arch of a patient at 202. Some of the present methods comprise constructing a patient-specific 3D model of the cephalic arch using medical imaging data. Some methods may comprise the step of characterizing patient-specific cephalic arches hemodynamics during flow simulations.

In some methods, the cephalic arch of a patient may be captured at more than one time period (e.g., first predetermined time and second predetermined time). Some methods may comprise the step of reconstructing patient-specific 3D geometry of the cephalic arch, where clotting is most like to occur, using imaging medical data. In some methods, computational models will be used for finite element simulations that match patient-specific physiological flow parameters like blood velocity, viscosity, hematocrit concentration, and pulse rate. Some methods may comprise, characterizing flow properties and induced wall shear stress in the cephalic arches of the patient at a first predetermined time (e.g., 3 months after AVF creation) and a second predetermined time (e.g., 12 months after AVF creation).

Method 200 further includes fabricating, validating and characterizing the fluid dynamics in a millifluidic cephalic arch devices (e.g., 14a, 14b) at 204. Some of the present methods provide the step of constructing (e.g., 3D printing) millifluidic devices (e.g., 14) from the computational models in order to fabricate soft elastomer molds that will serve as the mCA device. For example, a dissolvable 3D printed mold may be constructed and embedded within a transparent polymer (e.g., soft elastomer) after which the dissolvable (e.g., water-soluble) 3D printed master mold is removed by dissolving in pressurized, heated water, in a process akin to cire-perdue or lost-wax process to form a negative mold within the transparent polymer. Some methods may comprise the step of performing flow experiments on the mCA devices (e.g., 14). For example, some methods comprise validating the geometrical fidelity of mCA devices (e.g., 14) to patients' original vein imaging data. Some methods may further comprise programming a pressure driven flow apparatus (e.g., 18) to provide pulsatile, unidirectional flow in the fabricated vein models. In some methods, blood-mimicking fluid (BMF) with fluorescent particles may be may be pumped through a mCA device (e.g., 14) in order to visualize local hemodynamics in the cephalic arch under globally applied patient-specific flow conditions. In some methods, Particle Image Velocimetry (PIV) we be used to investigate physical properties such as wall shear stress (WSS), Reynolds number and recirculation pools in each vein model.

To illustrate, using a millifluidic cephalic arch devices (e.g., 14a, 14b) it was determined high WSS predisposes to thrombosis in arterial systems whereas low WSS initiates thrombosis in venous systems. Disturbed blood flow in an AVF reduces the physiological function of endothelial cells which protect the vascular wall against inflammation, oxidative stress, cell proliferation, platelet adhesion and thrombosis. In this way, some methods (e.g., 200) include determining an optimal range of WSS that could protect the endothelium and prevent thrombosis based on patient specific vein geometry. Some methods may include tailoring dialysis treatment based on individualized patient-specific thrombosis risk factors.

In some configurations, method 200 includes endothelializing the mCA device at 206. Some such methods include the step of evaluating vein endothelium erosion and thrombotic nucleation at patient-specific flow conditions. Some methods further include creating a predictive model for vein thrombosis. Some methods comprise endothelializing device with human umbilical vein endothelial cells (HUVECs) and perfuse with HUVECs media under patient-specific flow conditions. Some methods comprise, evaluating thrombosis nucleation by whole-blood perfusion of endothelialized mCA at patient-specific flow conditions. Some methods include, creating a cephalic arch thrombosis predictive model by integration of biophysical data.

Some methods comprise the step of monitoring fluid properties (e.g., turbulence, recirculation vortices, or the liked) in the models that serve as nidi for endothelium activation and thrombotic nucleation. In some configurations, monitoring fluid properties may comprise flowing cell media and blood into endothelialized devices (e.g., 14). In such configurations, Thrombus nidi will be referenced back to hemodynamics of corresponding sites to correlate local biological outcomes with local flow dynamics. Some methods further comprise, compiling patient-specific data sets in order to create a cephalic arch thrombosis predictive model that accounts for multiple factors (e.g., geometrical, flow and physiological trends).

It is noted that in some implementations, method 200 may include one or more operations as described with reference to control system 22. Additionally, or alternatively, control system 22 may be utilized to perform one or more steps of the aforementioned methods (e.g., 200).

Figure 7:
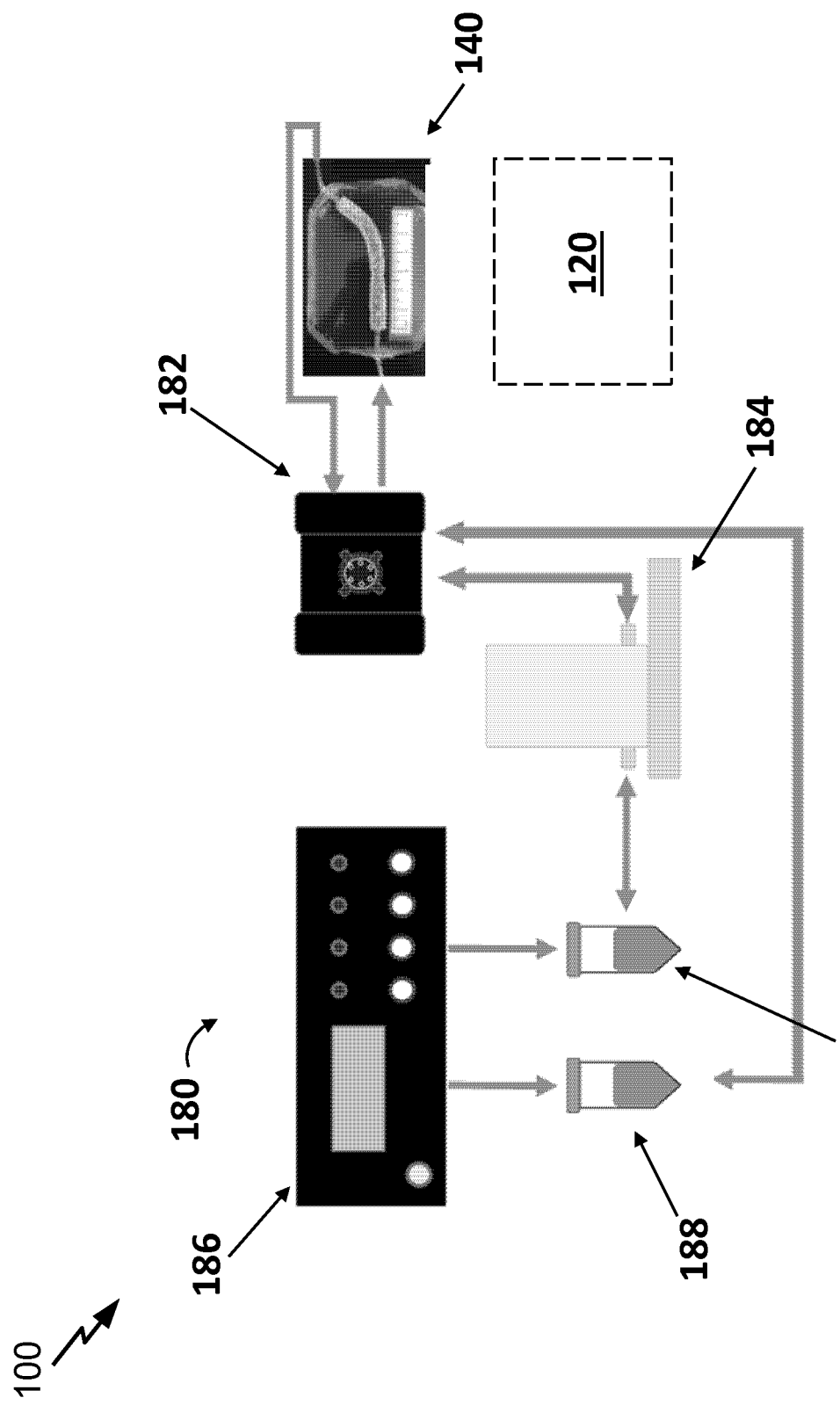
FIG. 7 is a diagram of another example of a mCA system.

Referring now to FIG. 7, an example of a millifluidic Cephalic Arch (mCA) system 100 is shown. The mCA system 100 may include or correspond to one or more components of mcCA system 10 and is used to analyze and predict thrombus formation under heterogeneous patient-specific physiological conditions. In the depicted configuration, mCA system 100 includes a millifluidic Cephalic Arch (mCA) device 140, a fluid system 180, and a control system 120. Fluid system 180 and control system 120 may include or correspond to fluid source 18 or control system 22, respectively.

As shown, mCA device 140 is coupled to fluid system 180 to deliver fluid through a lumen 142 defined by the mCA device. Fluid system 180 may include a fluid distributor 182, flow sensor 184, pressure modulator 186, one or more reservoirs 188, or combination thereof. In the depicted configuration fluid distributor may be directly connected to mCA device 140 (e.g., via tubes) to control flow of a fluid through the mCA device. In this manner, fluid distributor 182 can adjust flow parameters of the fluid through lumen 142. For example, fluid distributor 182 can adjust pulsatility, fluid pressure, fluid flow rate, fluid velocity, direction of flow, or the like. Flow distributor 182 may be coupled to flow sensor 184 and/or pressure modulator 186 to adjust the flow parameters of mCA system 100. In some configurations, flow sensor 184 measures a pressure, velocity, density, or other parameter of the fluid as it passes through the flow sensor. These measurements can be transmitted to flow distributor 182 and/or pressure modulator 186 directly or indirectly (e.g., via control system 120) to adjust the fluid flow to predetermined flow parameters.

Each of fluid distributor 182, flow sensor 184, and pressure modulator 186 may be in fluid communication with reservoirs 188. As shown in FIG. 7, fluid system 180 includes two reservoirs (e.g., 188), but other configurations may include more or less than two reservoirs. Each reservoir 188 may be in fluid communication with one or more of any other reservoir to transfer fluid between each other. Pressure modulator 186 can adjust the pressure in each reservoir (e.g., 188) to direct the fluid along a desired flow path, such as from a first reservoir, to flow sensor 184, to mCA device 140.

EXAMPLES

The present invention will be described in greater detail by way of specific examples. The following examples are offered for illustrative purposes only and are not intended to limit the invention in any manner. Those of skill in the art will readily recognize a variety of noncritical parameters that can be changed or modified to yield essentially the same results.

Example 1

3D Reconstruction of Millifluidic Device

Preoperative images (e.g., venogram and IVUS) were taken of a patient were used to construct a digital 3D model of the patient's cephalic arch. For this reconstruction 2D venogram and 3D IVUS images obtained from a patient were utilized to design a 3D millifluidic cephalic arch model. 2D venograms were performed by using a micropuncture system near the arterial anastomosis with contrast injection towards the venous limb. The needle was exchanged for a 5 French dilator, and a digital subtraction venogram encompassing the outflow from puncture site to the right heart was performed. This allowed for vein geometry including diameters and angles of curvature. IVUS was done using a catheter with an ultrasound probe at the distal end. The IVUS catheter was inserted through the cephalic vein outflow and arch to the axillary vein with measurements taken during pullback of the catheter. The study included 105 patients with a range of physiologic conditions, of which five patients were selected to provide IVUS, venogram, blood flow velocity, viscosity, and pulsatility. The venogram and IVUS images were performed at two separate time-points: 3-months after formation of the AVF and 12-months after formation of the AVF.

Figure 8B:
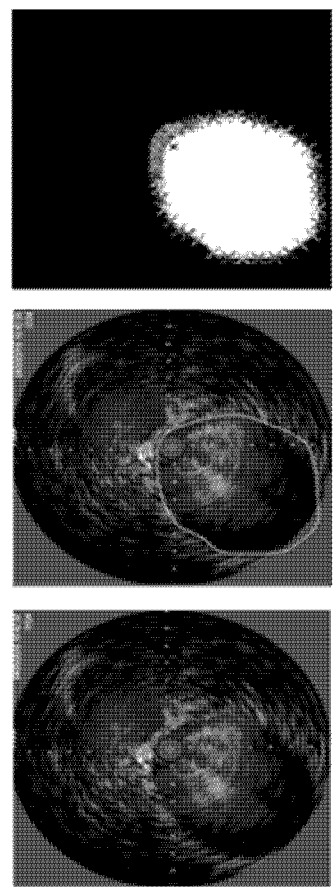
FIGS. 8A-8B illustrates 2D venogram preoperative images and 3D IVUS preoperative images, respectively, taken from a patient's Cephalic Arch.
Figure 8A:
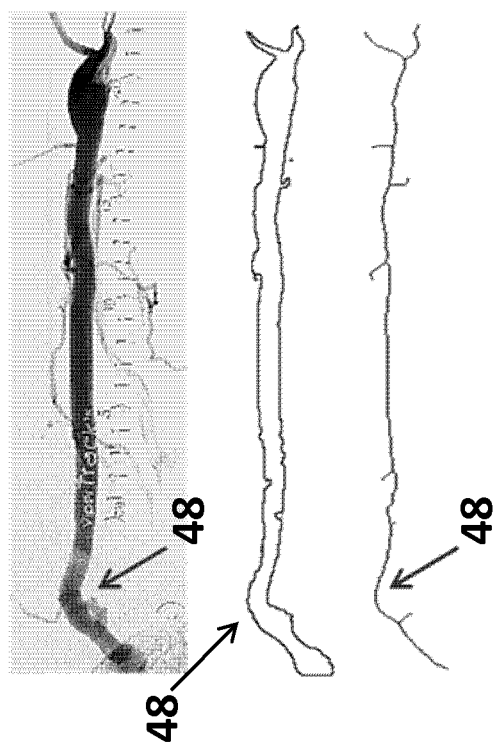

Image processing was performed on venogram, IVUS, and Doppler image sets with ImageJ, Python and MATLAB for use in the 3D reconstruction of the cephalic arch of each patient. FIG. 8A, illustrates aggregate venogram projection that is skeletonized to capture the gross anatomy of the cephalic arch, including the cephalic bend 348 (e.g., curved section). As shown in FIG. 8B, IVUS images with ChromaFlo capability (Philips), capturing 1 mm increments of the vein path per frame, were binarized in ImageJ. Using MATLAB code, the X and Y coordinates—corresponding to each vein contour—were determined. For untreated IVUS images, the vein contour was measured by hand, capturing $\frac{1}{30}$ mm increments of the vein path per frame. For this method, the vein contour of the untreated IVUS images were traced onto the frame in ImageJ at each millimeter (i.e., for every $30^{th}$ image), where the outline was binarized and run through MATLAB code to gather the X and Y coordinates, as shown in FIG. 8B.

Figure 10A:
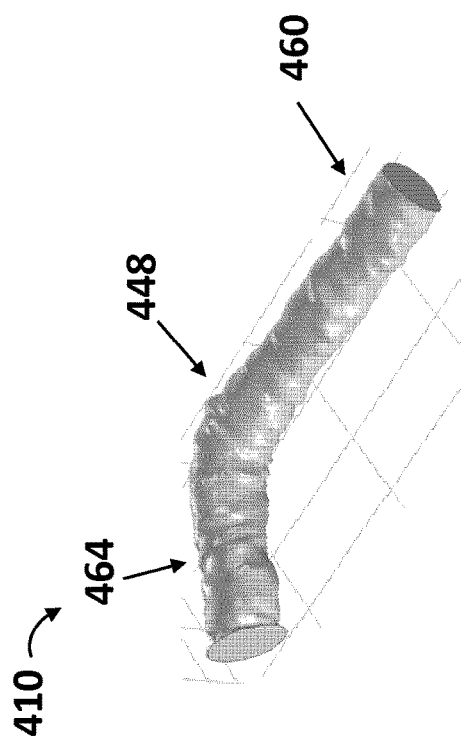
FIG. 10A is another example of a digital 3D CA model.

The two-dimensional aggregate venogram projection and the X, Y coordinates were utilized to create a 3D reconstruction of the cephalic arch, having lumen contours from IVUS slices at 1 mm intervals along the venogram path. The X, Y coordinates were imported into AutoCAD and scaled. The geometric center of the coordinates was also marked for each contour. A 3D model of the cephalic arch was then generated in SolidWorks by importing each contour to a plane perpendicular to the path and aligning the center of contour with the path. The digital 3D model was then completed by lofting together each contour, creating smooth curved lines along the structure to replicate the continuous curvature of the vein. Two 3D digital CA (cephalic arch) models were created using this method: a first CA model 310 (FIG. 9A) was modeled using the patient imaging at the 3-month time point and a second CA model 410 (FIG. 10A) was modeled using the patient imaging at the 12-month time point. Each CA model 310, 410 includes a pre-bend region 360, 460 (e.g., first portion), a bend 348, 448 (e.g., curved section), and a post-bend region 364, 464 (e.g., second portion), respectively.

A range of computational fluid dynamics (CFD) simulations were performed on both digital 3D models using COMSOL Multiphysics (COMSOL, Inc.). The vein geometries for each digital 3D model were modelled in 3D using the Laminar Fluid Flow module. Inlet flow velocity for the models was applied in the form of periodic waves (sinusoidal, square wave, saw-tooth) at frequencies calculated from pulse rates recorded at the time of IVUS and venogram measurements. Inlet flow for each time point can be seen in TABLE 1, below. The fluid was modelled as a Newtonian fluid with density=1060 kg/m$^3$ and dynamic viscosity=3.45 mPa·s, using density and viscosity values approximated from whole blood, along with no-slip boundary conditions and incompressible flow. Parallel Sparse Direct and Multi-Recursive Iterative Linear Solver (PARDISO) in COMSOL, along with normal, physics-controlled mesh size were used.

310 resembles plug-flow (Non-Newtonian), commonly seen in shear-thinning fluids. However, CA model 410's wider vein diameter in pre-bend region 460 is accompanied with decrease in average blood flow velocity (~9 cm/s); such a decrease in the velocity profile across pre-bend region 460 results in more Newtonian flow. At these flow parameters, the Newtonian flow profile of the fluid in CA model 410 is maintained along bend 448 and post-bend region 464. There is also low flow velocity and wall pressure along the inner wall of bend 448. This region with low WSS may provide a possible nidus of endothelial activation.

Figure 10C:
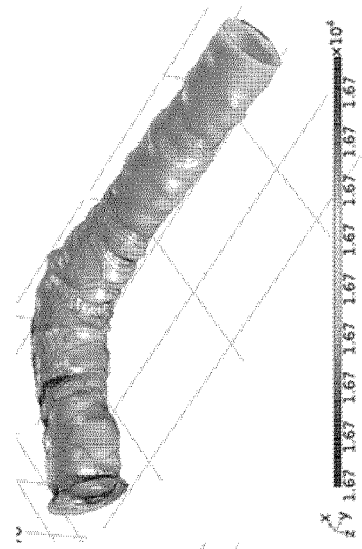
Figure 10B:
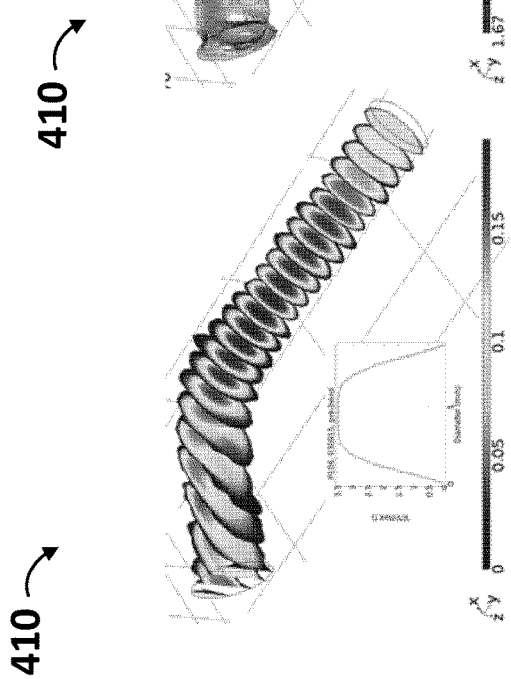

Using the parameter of TABLE 1 and assuming a sinusoidal flow pattern, we also simulate time-dependent flow for CA models 310, 410. The velocity (FIGS. 9B and 10B) and pressure profiles (FIGS. 9C and 10C) are plotted as function of time. The area of low WSS in CA model 310 is develops and dissipates in a periodic fashion under pulsatile flow, in accordance with the peak systolic and diastolic blood flow velocities. For CA model 410, however, the velocity profile across the vein cross-section varies between shear-thinning and Newtonian, according to the peak systolic and diastolic blood flow velocities in a sinusoidal manner.

Example 2

Fabrication of 3D Millifluidic Device

Preoperative images were also used to create a millifluidic (mCA) device 510 that can be used to investigate flow parameters of a patient's cephalic arch ex vivo. Upon constructing the computational vein model (e.g., as described in Example 1), a 3D vein model 598 was imported to AutoCAD and a fabrication box 590 was added to ease

TABLE 1

| | Inlet Flow Parameters of 3D CA Models | | | | | |
|---|---|---|---|---|---|---|
| Time point | Systolic velocity (cm/s) | Diastolic velocity (cm/s) | B/P (mm Hg) | Pulse (beats/min) | Vein diameter (cm) | Arch angle (Degree) |
| CA model 310 | 39.6 | 29.2 | 124/80 | 81 | 0.9 | 108 |
| CA model 410 | 9.37 | 4.63 | 125/81 | 84 | 1.214 | 113 |

We note that there are significant changes between average vein diameter and peak systolic and diastolic blood flow velocities at these two models, though overall blood pressure and pulse rates remain largely unchanged. This may indicate that there is local remodeling of the brachial vein, including the cephalic arch proximal to the AVF, despite the fact that overall blood flow properties in the patient remains essentially constant. The arch angle of CA model 410 remains largely unchanged from CA model 310. We also notice significant broadening in the average vein diameter in CA model 410 by as much as 34.9% as compared to CA model 310, along with significant decrease in blood flow velocities.

Figure 11:
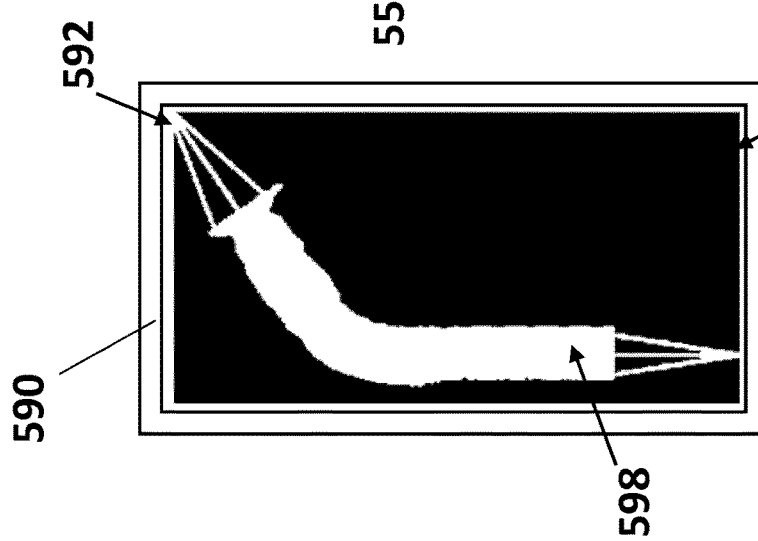
FIG. 11 is an example of a digital fabrication model of a mCA device.

Using the peak systolic velocity as inlet velocities and systolic blood pressure as outlet pressure summarized in TABLE 1, we plot steady-state velocity (FIGS. 9B and 10B) and pressure profiles (FIGS. 9C and 10C) for CA models 310, 410. As shown, flow velocities in CA model 310 are higher (~40 cm/s) than in model 410. The velocity profile across pre-bend region 360 (e.g., first portion) of CA model fabrication, as shown in FIG. 11A. Two cones 592, each 2 cm in length, were added to the two ends of the 3D vein model 598 to help stabilize the flow at the junctions between the vein model and the fluid recirculation system for the mCA device. The vein model and fabrication box 590 were exported as a .stl file and imported to Cura LulzBot Edition 3.2.21 software. 3D printing parameters were set to 0.38 mm resolution, printing temperature of 210° C., with densities of 100% and 10% for the print and support, respectively. The file was then exported as a GCode File (*.gcode) and transferred to the Taz4 3D printer (Catalog #LUKTPRO041NA, B&H Photo) using a 3 mm water-soluble, polyvinyl alcohol (PVA) polymer filament (Catalog #PVA300N05, eSUN). The resulting 3D printed assembly included a box mold 594 defining an interior 596 in which a vein model 598 was disposed.

Box mold 594 was then glued to a 150 mm×15 mm polystyrene Petri dish (not shown) and Polydimethylsiloxane (PDMS; Catalog #4019862, Dow), mixed at 1:5 ratio with the provided cross-linker, was poured into interior 596 of box mold 594 to encase vein model 598. Air bubbles trapped within the PDMS mix were removed by placing the Petri dish in a vacuum desiccator for 30 min. The PDMS mold was then cured in an oven at 65° C. for over 2 hours to form a block mold 540 embedded with the vein model 598. Block mold 540 was then separated from the box mold 594 to form mCA device 514. Subsequently, mCA device 514 was submerged in a water-filled autoclave tray, and liquid autoclave cycles were carried out to dissolve the PVA printed vein model 598 within the solidified PDMS block mold 540. The resulting mCA device 514, shown in FIG. 12A, defined a patient-specific venous conduit 552 inside the PDMS block mold 540. The mCA device 514 was then submerged in boiling water and wiped rapidly to remove any PVA particulate adsorbed on the device surface. Unless removed, the PVA particulate coating makes PDMS surfaces significantly cloudy which can deteriorate quality of fluorescent images obtained during flow experiments.

Figure 12B:
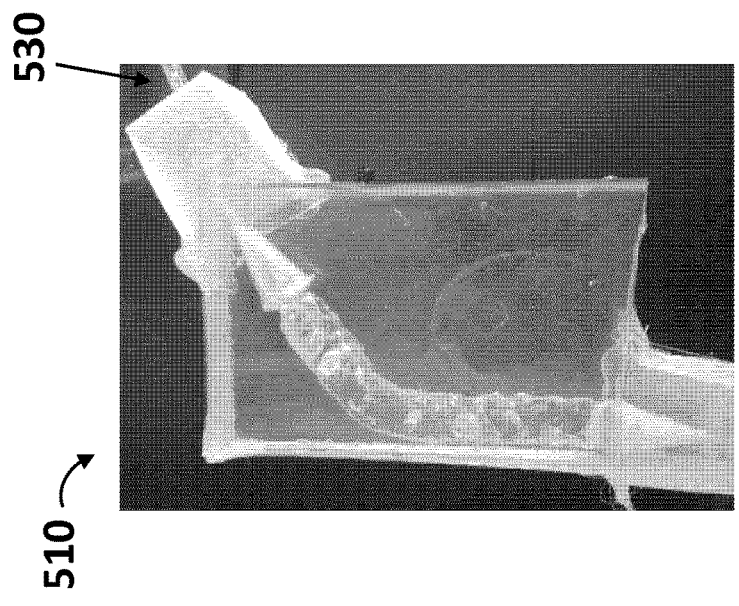
FIGS. 12A-B show an example of a printed mCA device according to the digital fabrication model of FIG. 11.
Figure 12A:
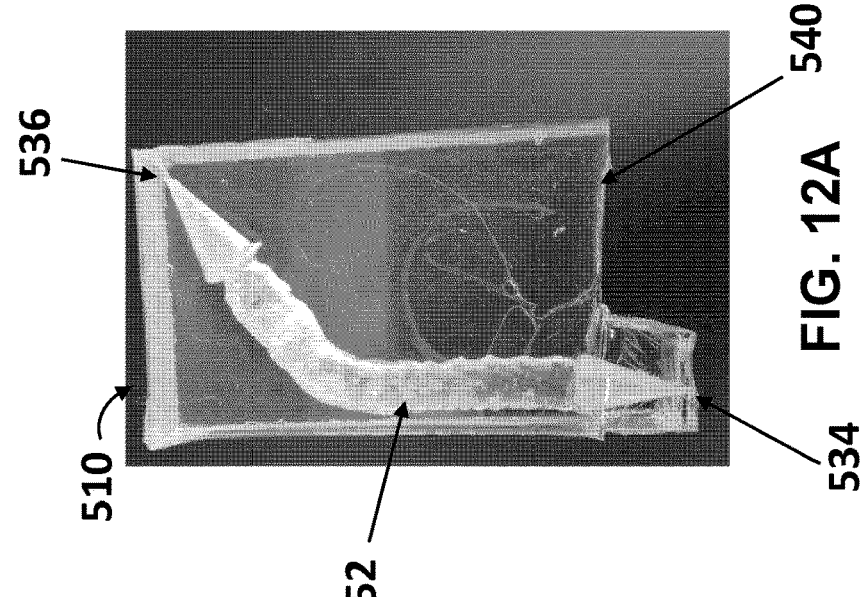

As seen in FIG. 12B, plastic barbed tube fittings 530 (1/16" OD 1/32" ID PEEK tubing rated for air and water) were attached to both the inlet 534 and outlet 536 of mCA device 514. Two smaller box-like molds were printed to cast PDMS in the junction between mCA device 514 and tubing 530 was connected to a fluid pressure system (not shown). Given the extremely high flow rates necessary to mimic physiological flow in the cephalic arch in ESRD patients, it is critical that leakage-free connections between the pump system and mCA device 514 were established.

Figure 13B:
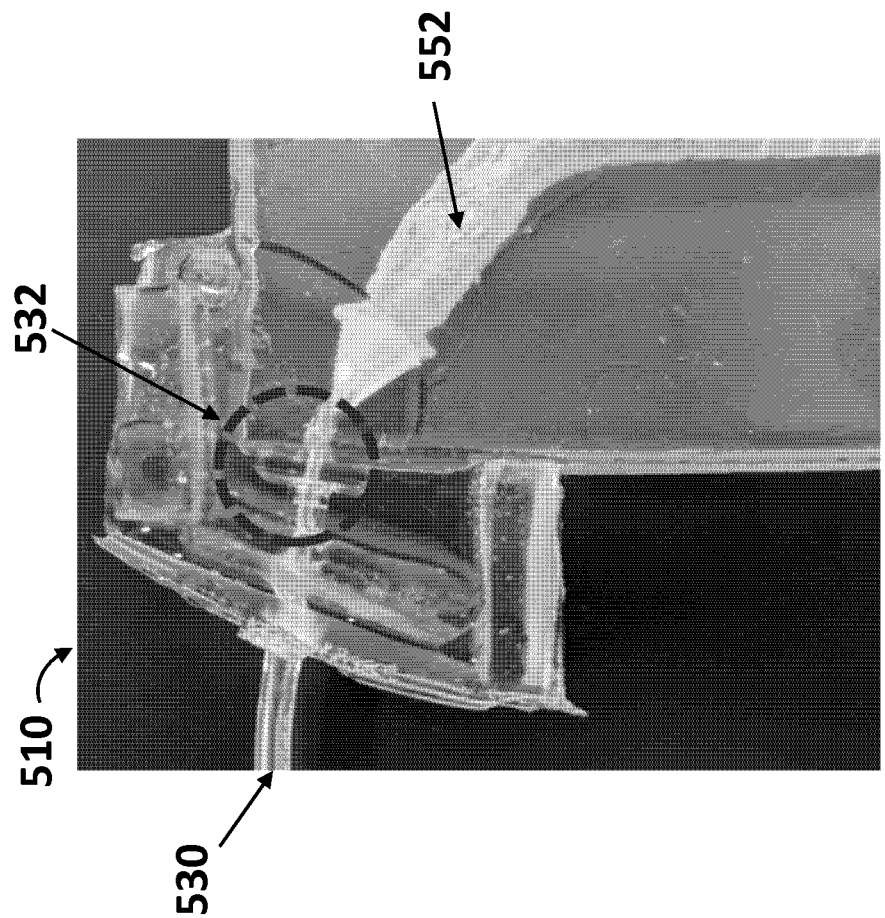
FIGS. 13A-B show a connection junction of the printed mCA device of FIGS. 12A-B and a fluid distribution system.
Figure 13A:
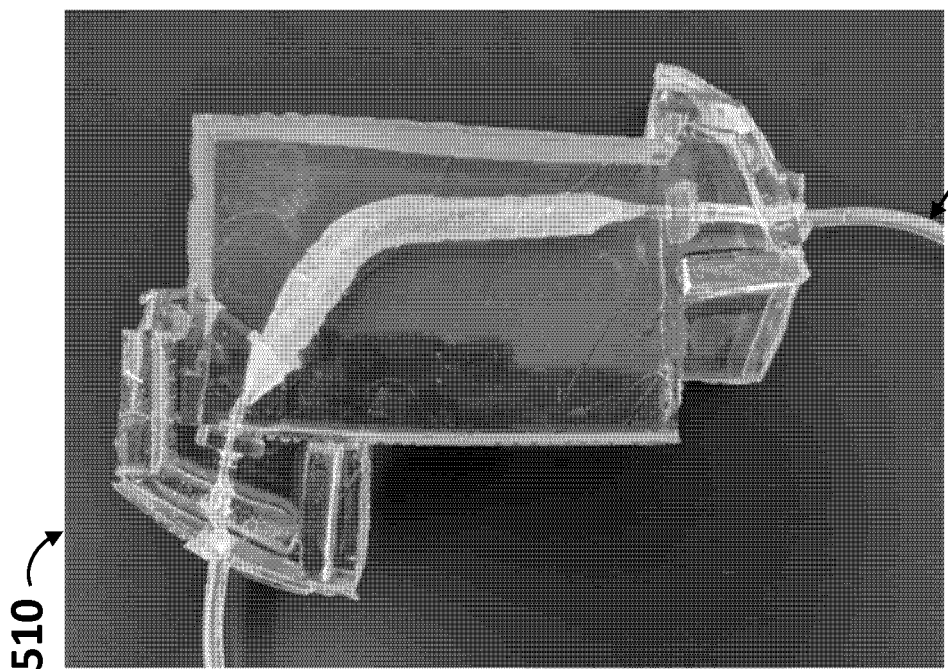
Figure 14B:
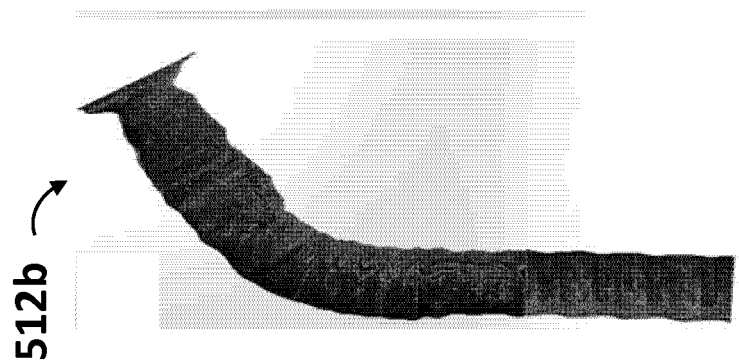
FIG. 14A is a digital 3D CA model of the printed mCA device of FIGS. 12A-B.
Figure 14A:
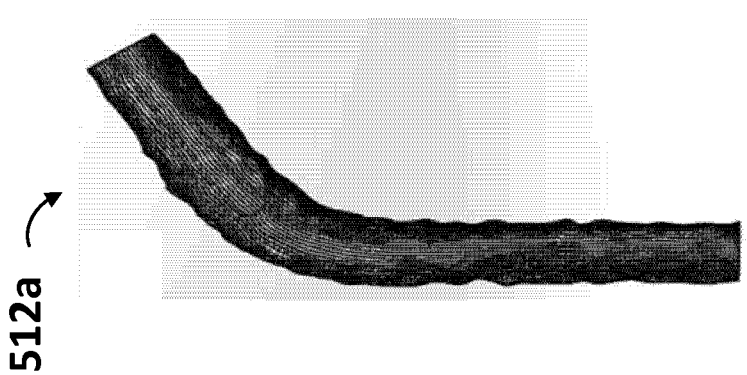

As shown in FIGS. 13A and 13B, the venous conduit 552 is connected to the fluid pressure system (e.g., 18) at a connecting junction 532. To make connecting junction 532, a cuffed tube-tube connection adapter was made in order to prevent device leakage at high flow rates. The ring portion of an 8 gauge AWG crimp ring terminal connectors (Item #IGCRT8-10, ASIN: B06XQ84HGW, Amazon) were cut with a metal sheet cutter (Part #DWHT14675, ASIN: B072LQJ6W9, Amazon) in order to obtain a cast-able cylindrical mold. Around 4 cm of the PEEK tubing was inserted into the 1/16" ID, 1/8" OD Tygon PVC clear tubing compatible with a pressure-driven flow control system. Three continuous 1/8" ID aluminum cable stops sleeves (Part #TUOR0122, ASIN: B07RGD841B, Amazon) were inserted through the Tygon PVC tubing, leaving around 1 cm of Tygon/PEEK tubing junction without a sleeve. The sleeves were then crimped with a wire rope crimping tool (Part #IWS-1608M, ASIN B0195XJI6Y, Amazon). The crimp ring terminal connector was placed around tubing junction, covering the crimped sleeves and the 1-cm bare tubing junction. The bottom of the terminal connectors was then sealed with parafilm M wrapping film (Catalog #S37440, Fisher) and the tubing junction was positioned vertically such that both tubing ends were coaxially aligned relative to the connector. Low-viscosity, cast-able epoxy resin (Item #4336899262, ASIN: B07BM9LHRB, Amazon) was poured into the tubing junction inside the terminal connector. The resin was allowed to cure at room temperature for at least 24 hr to ensure proper sealing of potential leakage gaps within the connecting junction 532. The inlet and outlet tubing were then connected to the MUX INJ re-circulator in the pressure system to drive unidirectional flow within the fluidic device To confirm the fidelity of 3D reconstruction of the internal vein geometry from IVUS imaging, we performed IVUS and optical imaging on mCA device 514 to generate a 3D digital model 512a (FIG. 14A) to compare with the originally generated CA model 512b (FIG. 14B), which was generated using preoperative images as described in Example 1. The mCA device 514 filled with 1× phosphate buffered saline (PBS) was punctured using a 21 G micropuncture needle and a 0.018 in micro-puncture wire was inserted into venous conduit 552 to serve as a guide wire for the imaging catheter. Next a 4 French (Fr) micro-puncture sheath was advanced over the guidewire and exchanged via a 0.035 in guidewire for a 5 Fr Cordis vascular introducer sheath (Cordis Corporation, Miami Lakes, Fla.) which was de-gassed, flushed and secured in place. Next, Hi-Torque Floppy II coronary guidewire (Abbott Vascular, Santa Clara, Calif.) with 0.014 in×74.8031 in dimensions was introduced into the lumen of mCA device 514 and positioned distally. Next, a Volcano Eagle Eye Platinum 20 MHz Intravascular Ultrasound (IVUS) catheter (Philips) was prepared, flushed and introduced over the 0.014 in coronary guidewire into venous conduit 552 and subsequently positioned within inlet 534 to simulate the in vivo starting IVUS position. The IVUS catheter was calibrated to eliminate near-field ring-down artifact and the field of view was adjusted on the IVUS console to insure full circumferential visualization of the model. As the PDMS block mold 540 is transparent, venogram imaging of venous conduit 552 was not required. Direct imaging of the general contour of venous conduit 552 was taken when the venous conduit perfused with food color dye. These images were then processed using 'threshold' and 'skeletonize' functions in ImageJ and combined with the IVUS images of mCA device 514 to reconstruct 3D CA model 512a. Two 3D CA models (e.g., 512a) were constructed using the method described above with mCA device 514 being rotated 180 degrees between measurements.

Figure 15A:
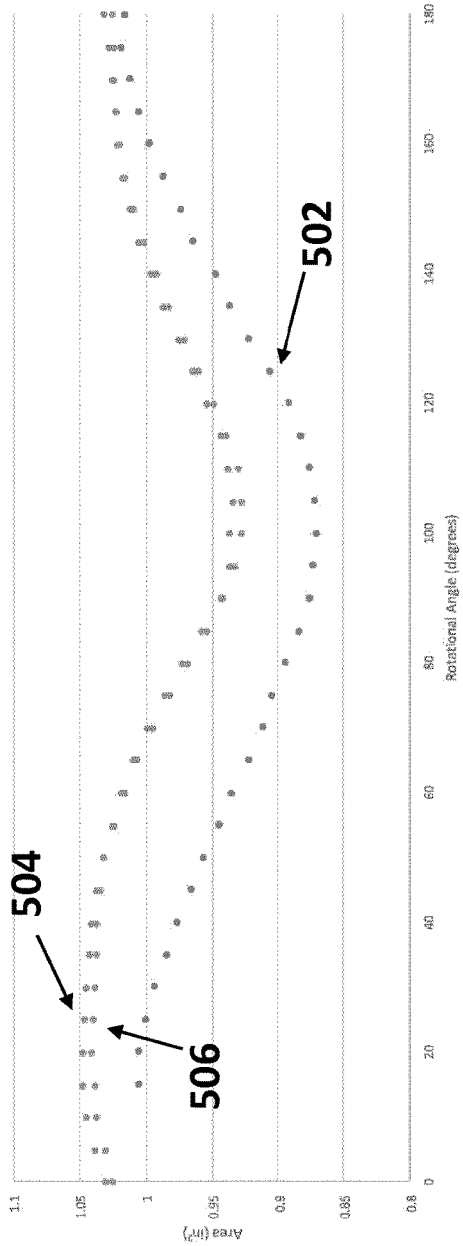
FIG. 15A is a plot of measurements taken from the digital 3D CA model of FIG. 14A and the digital 3D CA model of FIG. 14B.
Figure 15B:
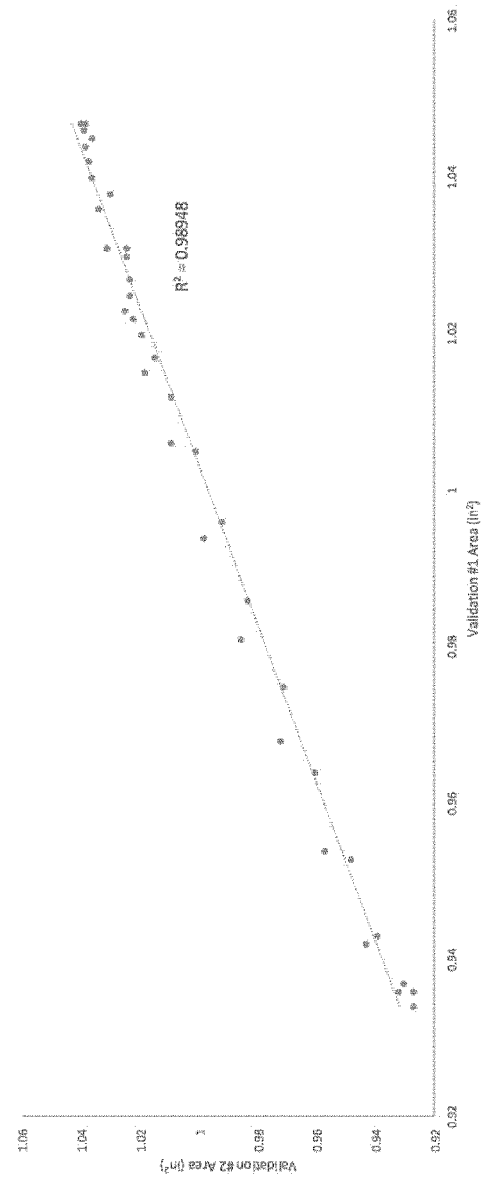
FIGS. 15B-D are correlation plots between the measurements shown in FIG. 15A.

The original CA model 512b and the recreated 3D models 512a were aligned on a common axis using SolidWorks, and the overlapping and non-overlapping regions were compared. FIG. 15A shows a plot of each 3D CA model, where 502 represents the measurements of the original CA model 512b, 504 represents the first measurements of the recreated CA model (e.g., 512a), and 506 represents the second measurements of the recreated CA model (e.g., 512a) when turned upside down. As shown, the measurement plots 504 and 506 of CA model 512a are almost identical. This is confirmed by plotting the area measurements of 504 and 506 against each other, seen in FIG. 15B. The R-squared value is almost 0.99 indicating an extremely strong positive correlation.

Figure 15C:
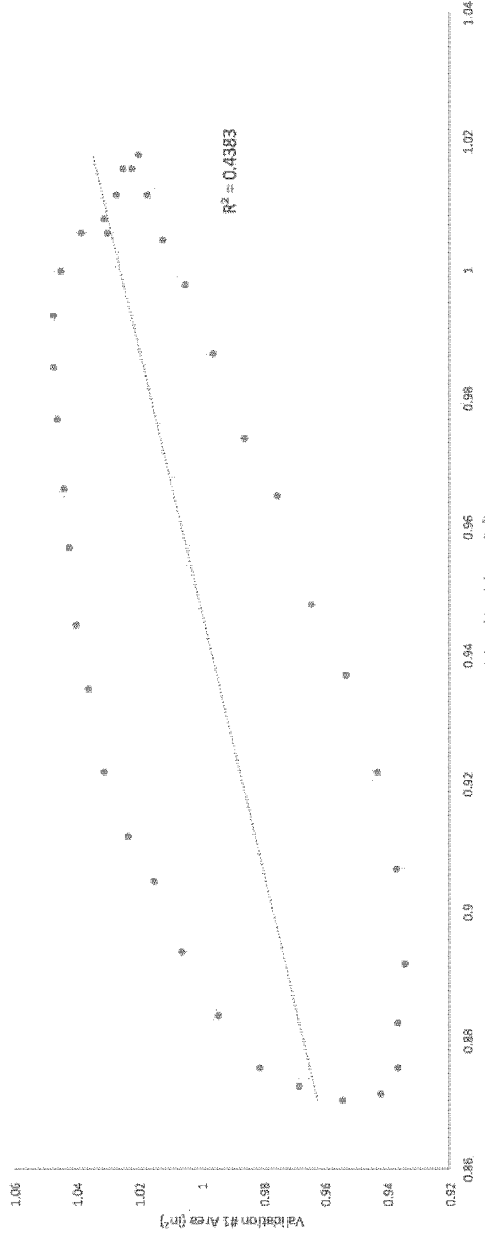
Figure 15D:
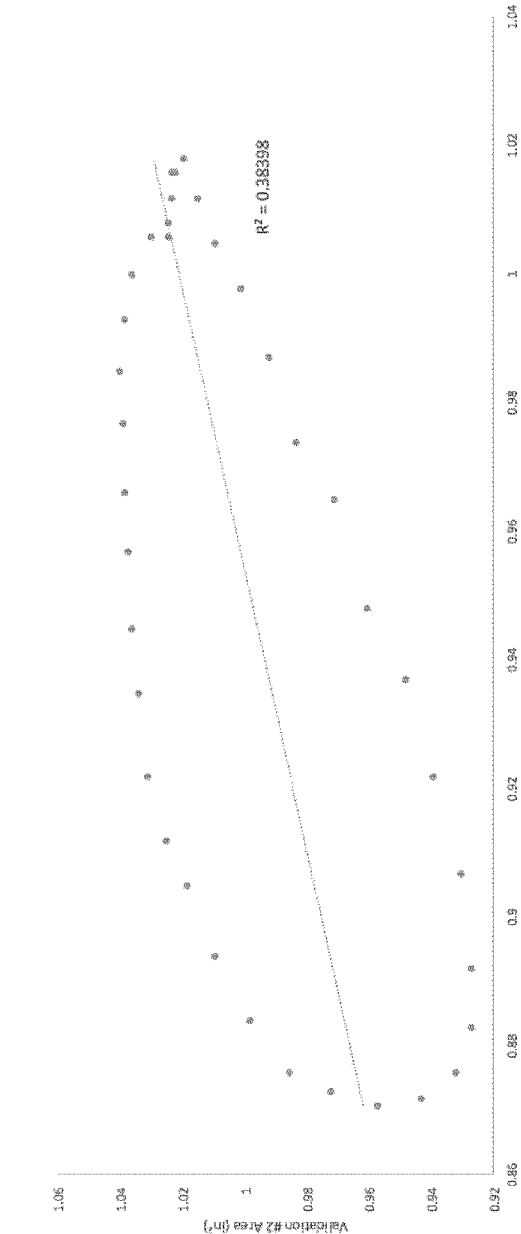

As seen in FIG. 15A, each variation 504, 506 of the measurement of CA model 512a follows the same pattern of original CA model 512b, with a higher area of about 0.05 in$^2$. The volumes of the non-overlapping regions were calculated and compared to the original models. The differences between the actual and fabricated model was 5.204% showing a preservation of the global and local topologies of 95%. Each area measurement of measurements 504 and 506 of CA model 512a were also plotted against original CA model 512b, as shown in FIGS. 15C and 15D. Both measurements of the recreated 3D model have similar correlations to the original 3D model with R-squared values being around 0.4, indicating a moderate positive linear association. The similarities between the 3D model generated from the patient cephalic arch and the 3D model generated from mCA device 514 yields confidence to both the 3D vein reconstruction modeling using IVUS and venogram images, as well as to the fabrication method of mCA device 514. Accordingly, the 3D models and recreated mCA devices are accurate representations of vein topologies of patient specific venous conduits (e.g., cephalic arch). Accordingly, subsequent experimentation of patient specific mCA devices (endothelialized or otherwise) may be performed without any risk of harming the patient. Additionally, various cephalic arch vein geometries and flow parameters may be tested to build a predictive platform than can be used to predict risk factors in individual patients ex vivo. The patient specific mCA devices allows enhanced identification of thrombosis and stenosis risk factors enabling specific treatment regimens to prevent and treat cephalic arch thrombosis and AVF failure.

Example 3

Flow and Imaging Setup for mCA Device

Figure 16A:
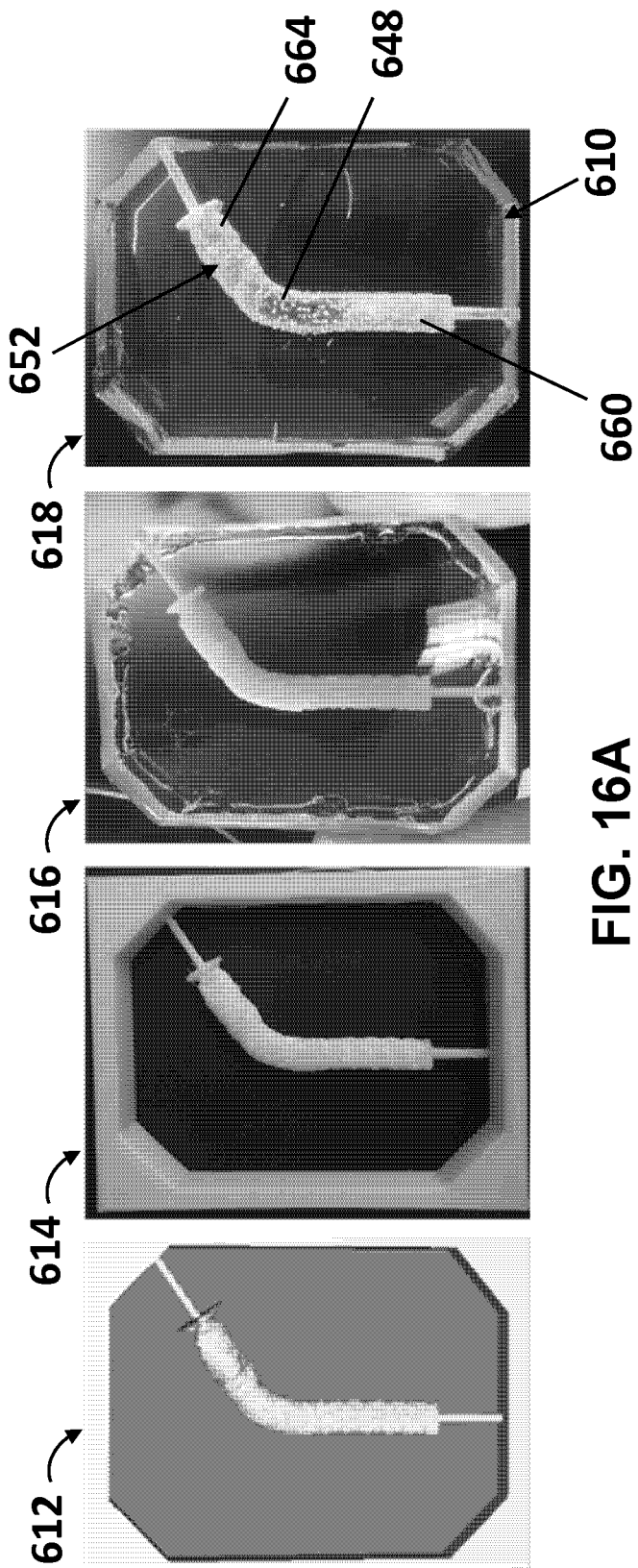
FIG. 16A illustrates an illustrative process for fabricating an example of a mCA device.

A millifluidic (mCA) device 610 was fabricated from preoperative images of a patient's cephalic arch. FIG. 16A illustrate the formation of mCA device 610, which is similar to that described in Example 2. As shown in step 612, a 3D digital model was created from preoperative images of a patient's cephalic arch. At step 614, the 3D digital model was printed using a 3D printer with the cephalic arch model disposed within a fabrication box. At step 616, the box was filled with moldable material (e.g., PDMS) so that the cephalic arch model is embedded within the moldable material. At step 618, the cephalic arch model is dissolved leaving a venous conduit defined within the moldable material. The resulting mCA device 610 includes a venous conduit 652 having a pre-bend region 660, a bend region 648, and a post-bend region 664.

The formed mCA device 610 was imaged on an Olympus IX83 microscope, perfused with a) 1×PBS, and b) Blood-mimicking fluid (EGM-2 media with 4% (w/v) Dextran, D4876-50G, Sigma-Aldrich), both containing trace amounts of fluorescently labelled polystyrene microbeads (Catalog #FCDG008, Bangs Labs), 5 μm in diameter. The fluids were perfused in the device under both steady-state and pulsatile flows using an OB1 MK3+ pressure-driven flow control system (Elvesys, France) in conjunction with a MUX INJ 6-port/2 position recirculation valve (Elvesys, France) to apply continuous, programmable, unidirectional flow on the millifluidic devices.

The steady-state flow, 10 mL/min, represents a healthy flow rate for non-arterialized cephalic veins. The fluid was circulated into the device at steady state to characterize flow patterns in the device as a function of local vein geometry; flow rate was maintained at 10 mL/min and the cephalic arch was imaged under epifluorescence. Similar steady-state flow experiments were conducted at 50 mL/min to simulate hemodynamics at high flow rates under cephalic arch remodeling. In contrast, pulsatile flow is patient-specific and derived from systolic and diastolic velocities obtained from Doppler measurements done at 3 and 12 months after the AVF was created. To mimic pulsatile flow in mCA device 610, flow rate was varied periodically corresponding to the patient's diastolic-to-systolic ratio to approximate a sawtooth waveform that changed phase every 300 milliseconds (ms). The flow trajectories of the fluorescent beads were imaged under 2× and 4× magnifications using a Hamamatsu ORCA camera and Metamorph image acquisition software under GFP illumination (488 nm/510 nm excitation/emission). The exposure times were varied between 30-100 ms, commensurate with applied flow rates and magnification that yielded fluorescent streaks of reasonable lengths from which local flow velocities in different regions of the devices were calculated.

Figure 16D:
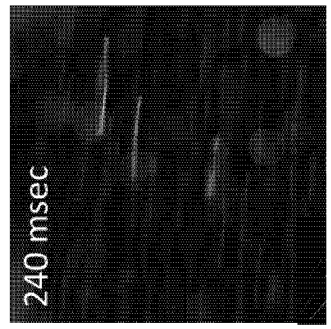
FIGS. 16B-16D are optical images of fluorescent tracer particles under flow in the mCA device of FIG. 16A obtained at 4× magnification and 60, 120 and 240 msec exposures, respectively.
Figure 16C:
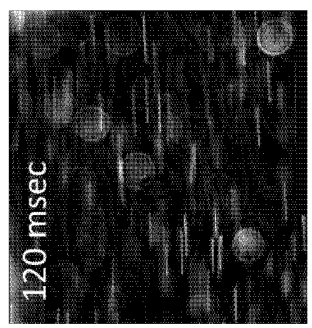
Figure 16E:
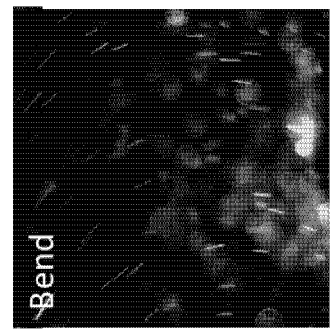
FIG. 16E is an optical image of the fluorescent tracer particles in a bend region of the mCA device of FIG. 16A.
Figure 16B:
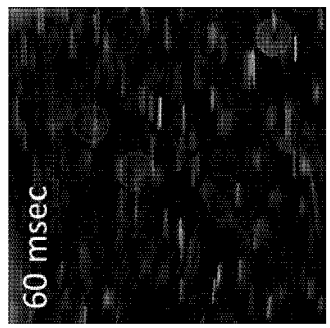

Increasing the exposure time for image capture allows us to visualize the movement of the fluorescent beads as bright streaks, as illustrated in FIGS. 16B-16D. The lengths of each streak are used to calculate the local flow velocity at the position being imaged, referred to as region of interest (ROI), and measured at different applied flow velocities. Note that for a given velocity of flow applied by the pressure manifold, longer exposure times lead to longer fluorescent streaks in the images. For example, FIG. 16B shows the fluorescent beads in pre-bend region 660 captured with an exposure time of 60 milliseconds, while FIGS. 16C and 16D show fluorescent beads in the pre-bend region at the same flow velocity when captured with exposure times of 120 milliseconds and 240 milliseconds, respectively. Therefore, the streak length may be measured and used to determine local fluid velocity within the venous conduit of mCA device 610 for predetermined exposure times.

Different regions of mCA device 610 are imaged in this fashion and the images can be compared to determine the differences in the flow parameters. For example, FIG. 16E shows fluorescent beads at bend region 648 captured with an exposure time of 120 milliseconds. We recorded and compared the images of the flow fields in these ROI (pre-bend 660, bend 648, and post-bend 664 regions) repeatedly for different fluid viscosity, density, velocity, and pulse frequency and waveforms, using an automated motorized stage mounted on the microscope and also controlled using Metamorph. Short videos of ~5-10 s duration that sampled flows in different ROI were acquired under the above flow conditions and analyzed off-line using ImageJ and Python.

Videos were saved as individual tiff files and pre-processed using NIH ImageJ macro-code to extract high-contrast streamlines for hemodynamics analysis. ImageJ preprocessing consisted of performing the following functions in the sequence mentioned: contrast enhancement, de-speckling, background fluorescence subtraction, maxima filtering, threshold adjustment, binarization, and ridge detection plug-ins. Given that experimental conditions such as objective magnification and bead concentration affect detected streamline quality; pertinent macro-code adjustments were made for each data set. Based on the ridge detection output, filtering of false streamlines was necessary to proceed to Python-based hemodynamics pipeline with high-quality streamlines. Likewise, the vein wall boundary was manually outlined, binarized and exported in the .png format to integrate into the image analysis pipeline to calculate wall shear stress (WSS) and Reynold's number (Re).

Figure 17D:
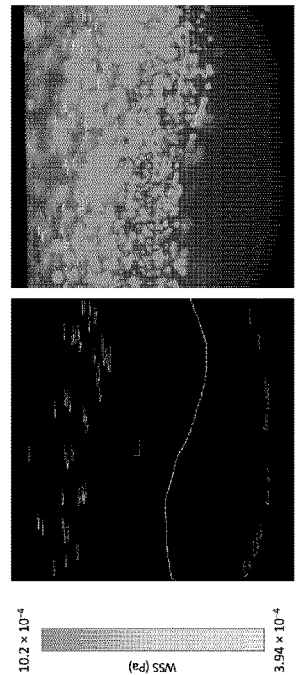
FIGS. 17A-E illustrate local wall shear stress characterizations of a mCA device at five different locations.
Figure 17E:
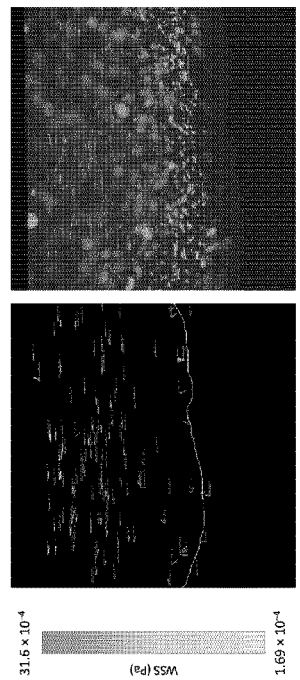
Figure 17A:
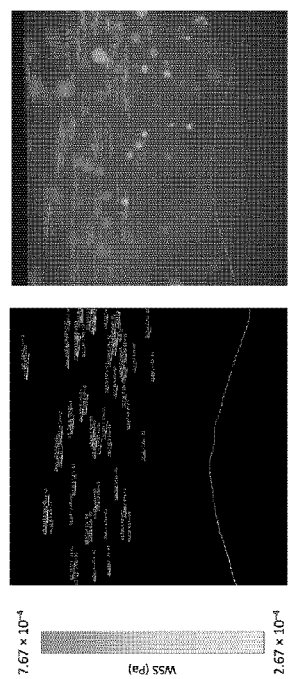
Figure 17B:
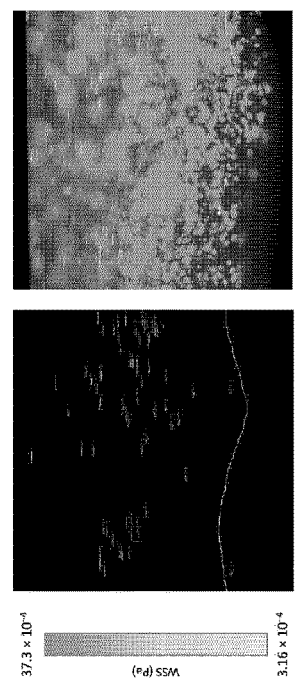
Figure 17C:
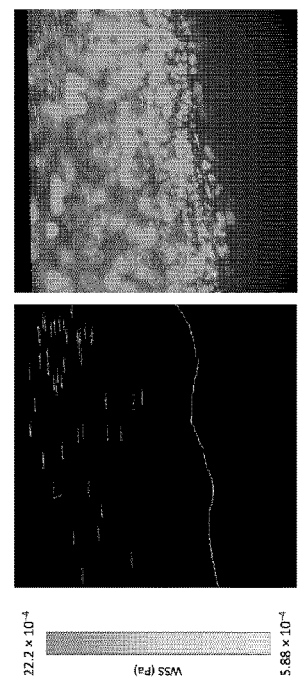

After assigning the streamlines to each frame, we aggregated all streamlines in the same video/time series into a global frame. We constructed a vein wall boundary based on the contour of mCA device 610. For each pixel point in the wall boundary, we searched all the streamlines within a fixed, small distance (300 pixels) and assigned the nearest streamline to the pixel point on the wall boundary. Then we normalized the length for all frames to [0, 1] and applied a color scheme to show the speed variation along the wall boundary. Afterwards, we account for the BMF viscosity and the distance of detected streamlines to the wall boundary to calculate the WSS. Wall shear stress, τ was calculated as $$\tau = \eta \frac{v}{h},$$

where η is the fluid's dynamic viscosity, v is the streamline velocity and h is the distance between streamline and vein wall boundary. FIGS. 17A-E show the wall shear stress for mCA device 610 at a flow velocity of 5 mL/minute for five different location along the venous conduit, with FIG. 17A representing a most proximal location (e.g., in pre-bend region 660) and FIG. 17E representing a most distal location (e.g., in post-bend region 664). Each of FIGS. 17B-17D showing the wall shear stress at sequential locations between (e.g., in bend region 648) the locations at FIG. 17A and FIG. 17E.

Example 4

3D Reconstruction of Additional Millifluidic Devices

Digital 3D CA models were constructed for 5 separate patients according to the method explaining in Example 1, above. A first CA model was constructed according to measurements taken 3-months after formation of the AVF and a second CA model was constructed according to measurements taken 12-months after formation of the AVF. Each model was subjected to velocity and pressure profile mappings using CFD.

Figure 18D:
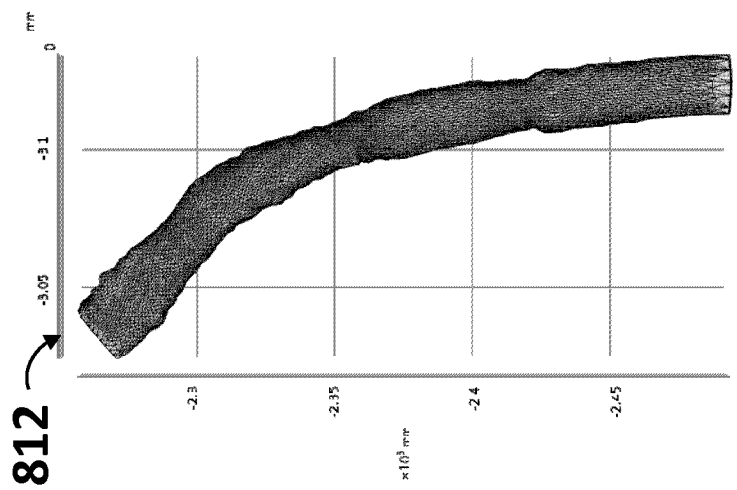
FIG. 18D is an example of a digital 3D CA model taken from the first patient at a second time.
Figure 18A:
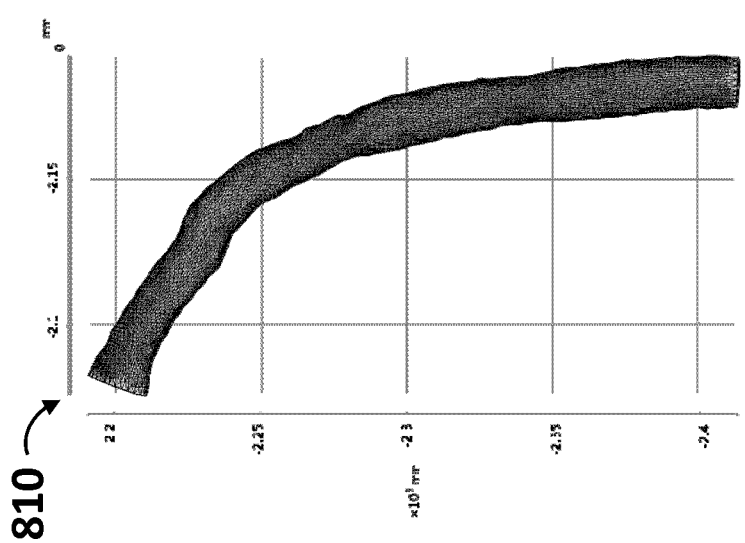
FIG. 18A is an example of a digital 3D CA model taken from a first patient at a first time.
Figure 18E:
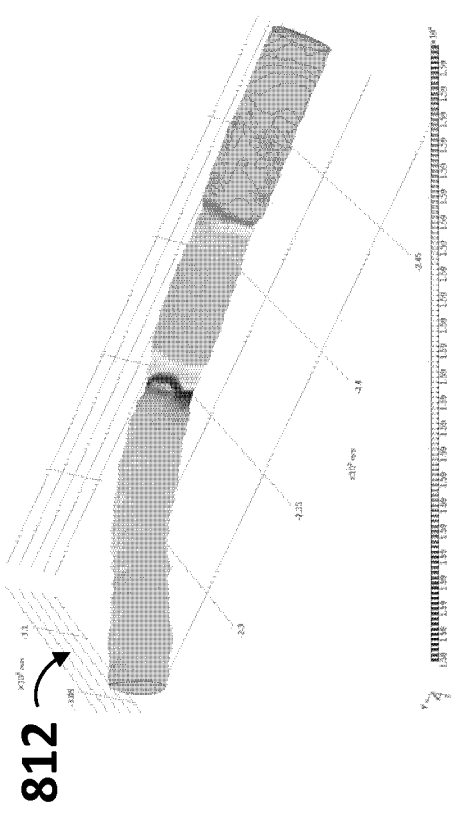
FIGS. 18E-18F are a wall pressure profile and a velocity profile, respectively, of the digital 3D CA model of FIG. 18D.
Figure 18F:
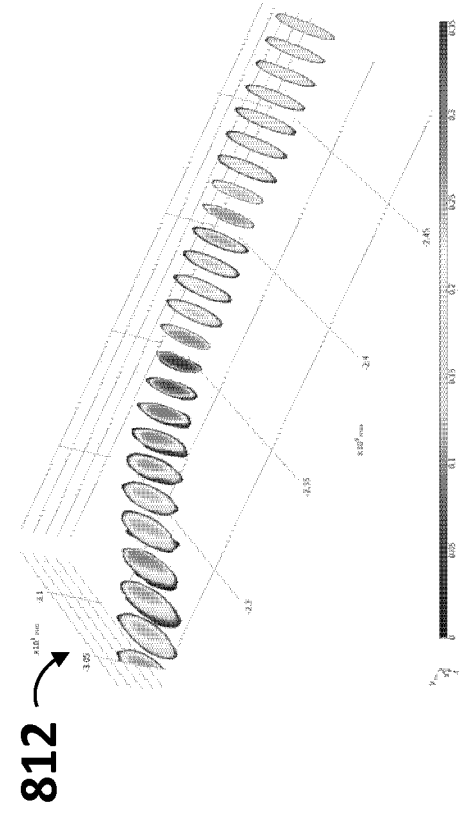
Figure 18B:
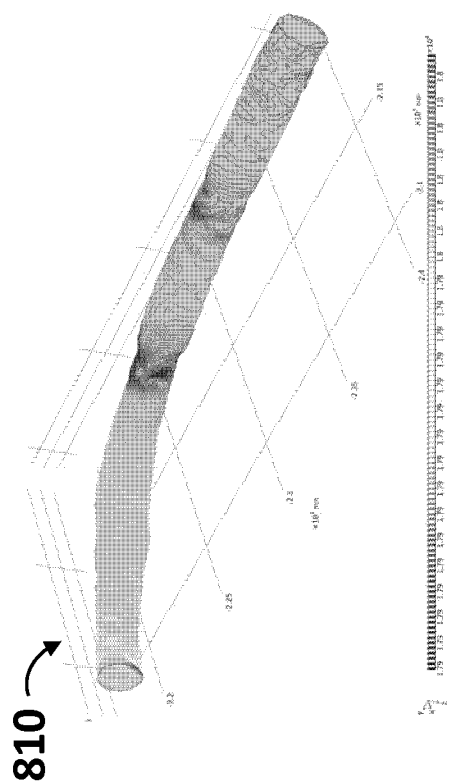
FIGS. 18B-18C are a wall pressure profile and a velocity profile, respectively, of the digital 3D CA model of FIG. 18A.
Figure 18C:
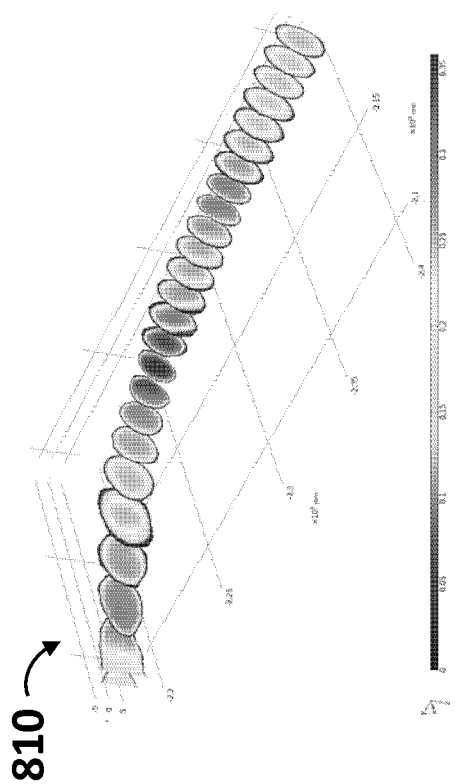

FIGS. 18A-C show the digital 3D model, the pressure profile, and the velocity profile of first CA model 810 of a first patient at the 3-month time point. FIGS. 18D-F show the digital 3D model, the pressure profile, and the velocity profile of second CA model 812 of the first patient at the 12-month time point.

Figure 19D:
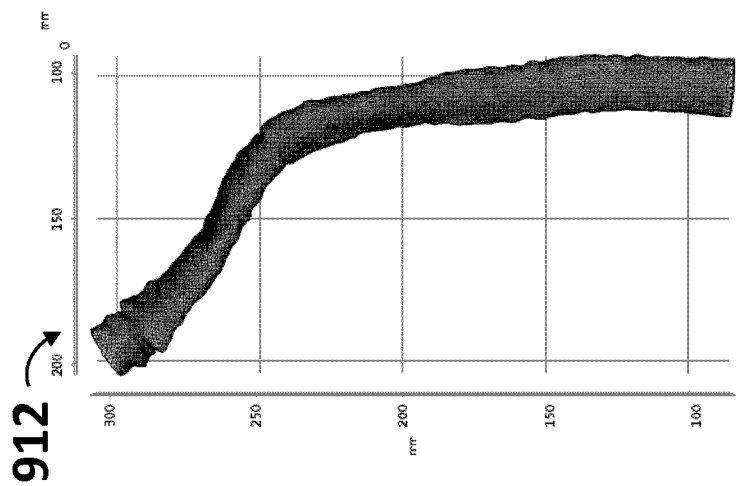
FIG. 19D is an example of a digital 3D CA model taken from the second patient at a second time.
Figure 19A:
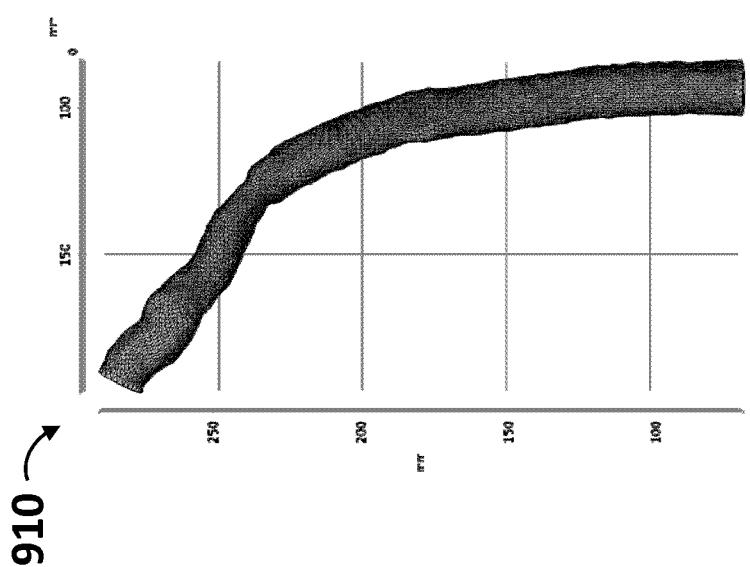
FIG. 19A is an example of a digital 3D CA model taken from a second patient at a first time.
Figure 19E:
FIGS. 19E-19F are a wall pressure profile and a velocity profile, respectively, of the digital 3D CA model of FIG. 19D.
Figure 19F:
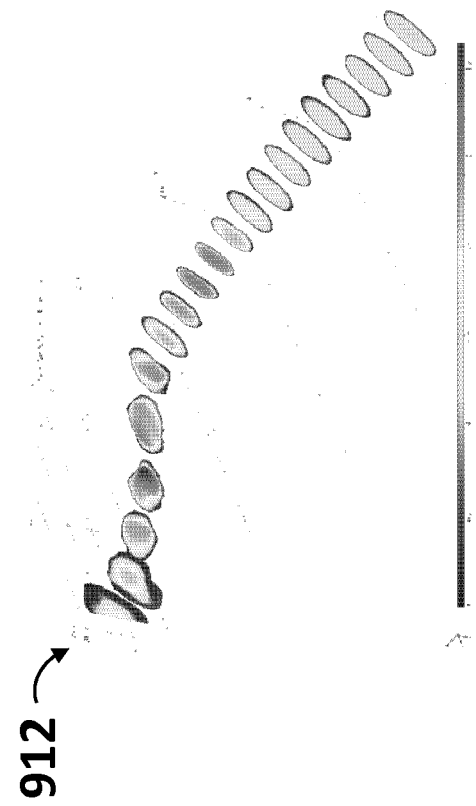
Figure 19B:
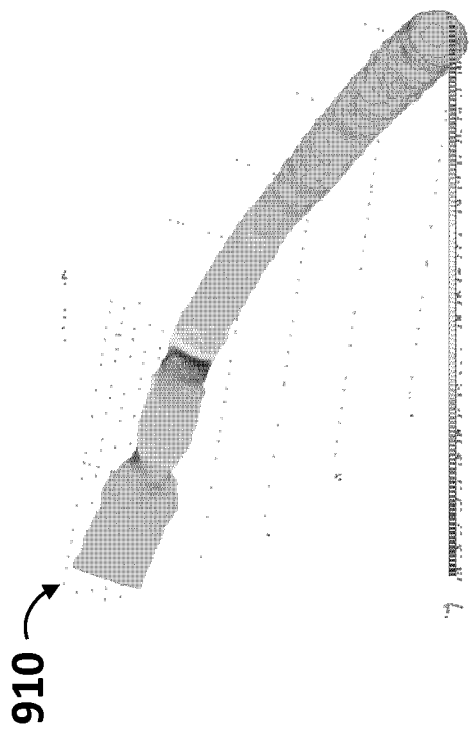
FIGS. 19B-19C are a wall pressure profile and a velocity profile, respectively, of the digital 3D CA model of FIG. 19A.
Figure 19C:
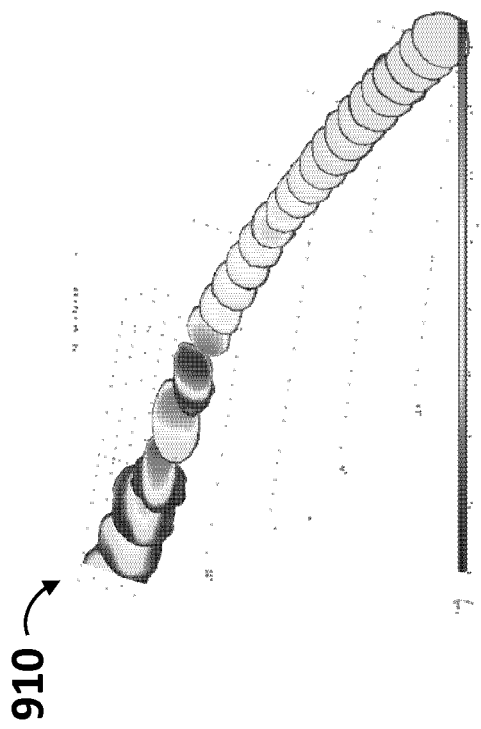

FIGS. 19A-C show the digital 3D model, the pressure profile, and the velocity profile of first CA model 910 of a second patient at the 3-month time point. FIGS. 19D-F show the digital 3D model, the pressure profile, and the velocity profile of second CA model 912 of the second patient at the 12-month time point.

Figure 20D:
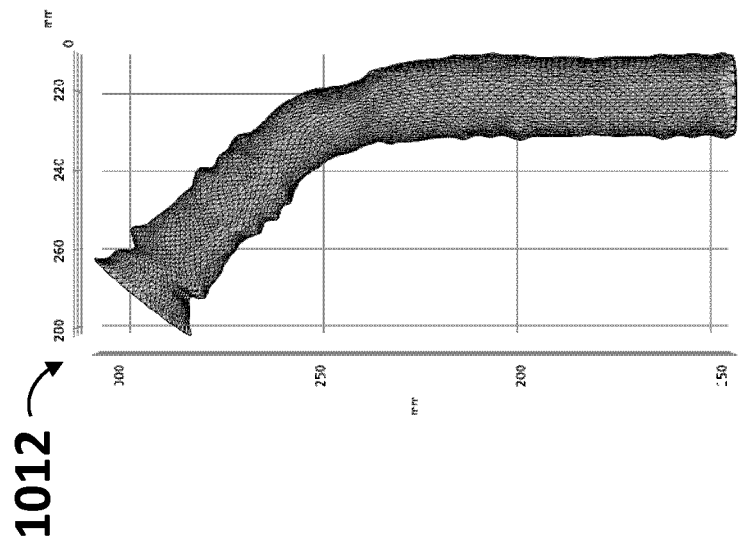
FIG. 20D is an example of a digital 3D CA model taken from the third patient at a second time.
Figure 20A:
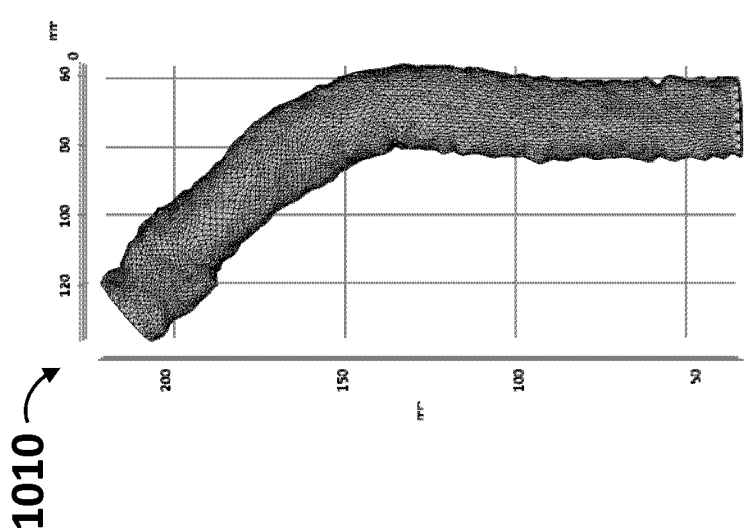
FIG. 20A is an example of a digital 3D CA model taken from a third patient at a first time.
Figure 20B:
FIGS. 20B-20C are a wall pressure profile and a velocity profile, respectively, of the digital 3D CA model of FIG. 20A.
Figure 20C:
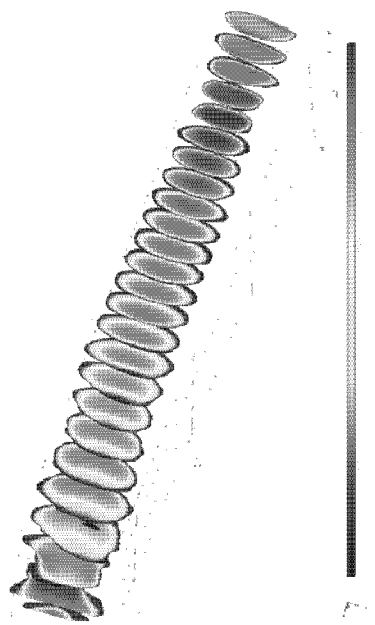
Figure 20E:
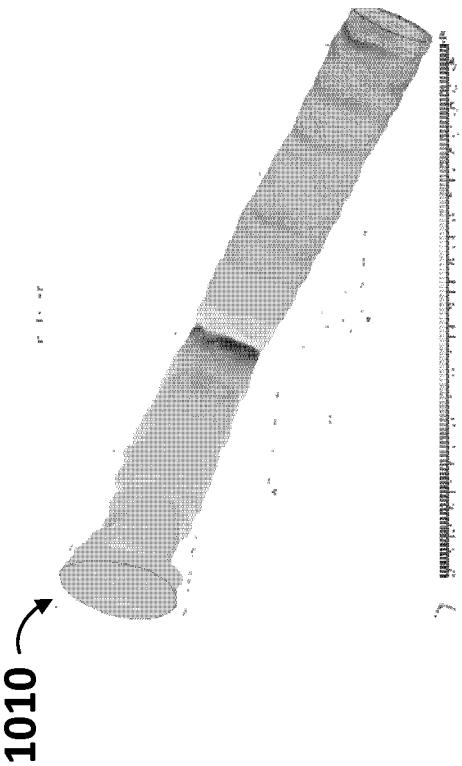
FIGS. 20E-20F are a wall pressure profile and a velocity profile, respectively, of the digital 3D CA model of FIG. 20D.
Figure 20F:
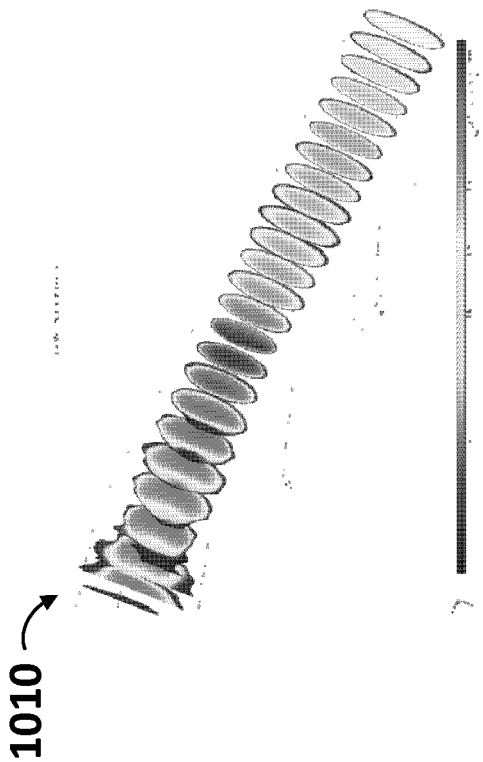

FIGS. 20A-C show the digital 3D model, the pressure profile, and the velocity profile of first CA model 1010 of a third patient at the 3-month time point. FIGS. 20D-F show the digital 3D model, the pressure profile, and the velocity profile of second CA model 1012 of the third patient at the 12-month time point.

Figure 21D:
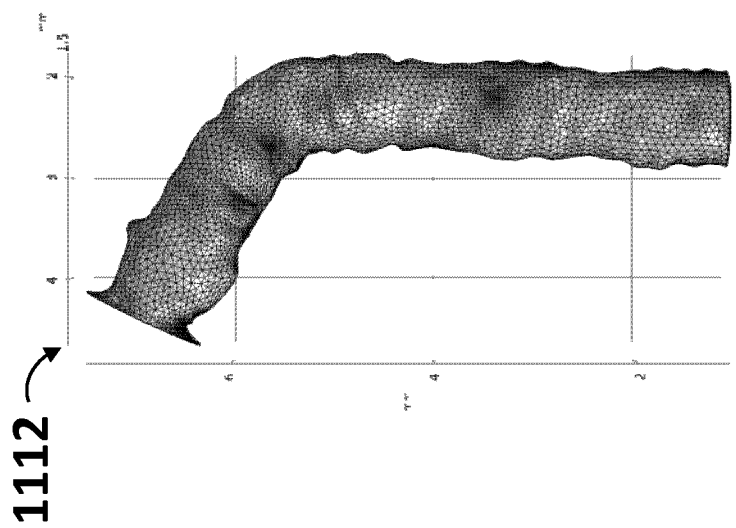
FIG. 21D is an example of a digital 3D CA model taken from the fourth patient at a second time.
Figure 21A:
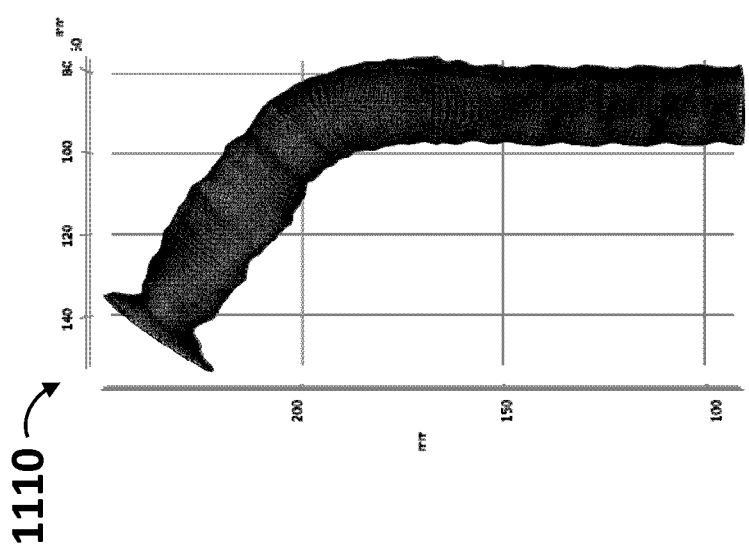
FIG. 21A is an example of a digital 3D CA model taken from a fourth patient at a first time.
Figure 21E:
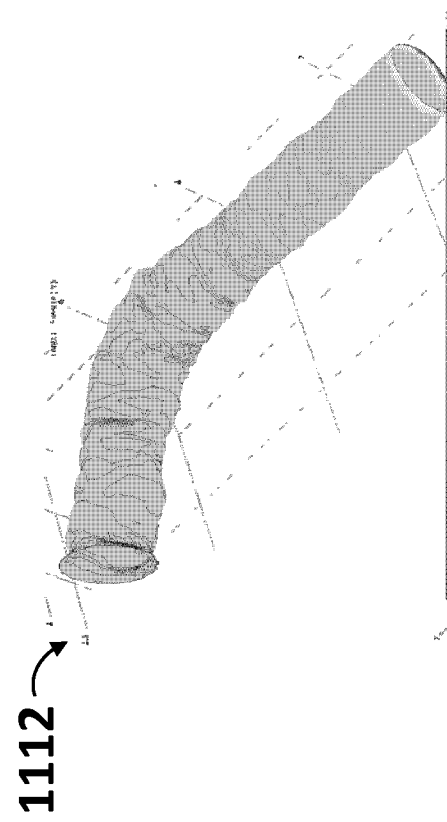
FIGS. 21E-21F are a wall pressure profile and a velocity profile, respectively, of the digital 3D CA model of FIG. 21D.
Figure 21F:
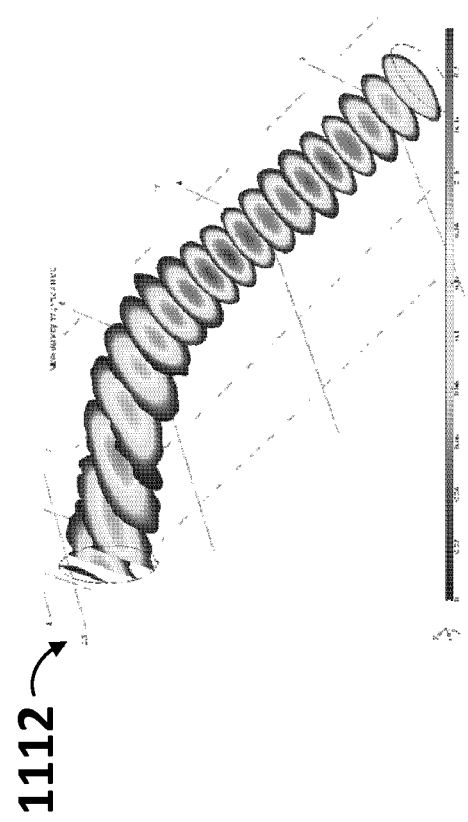
Figure 21B:
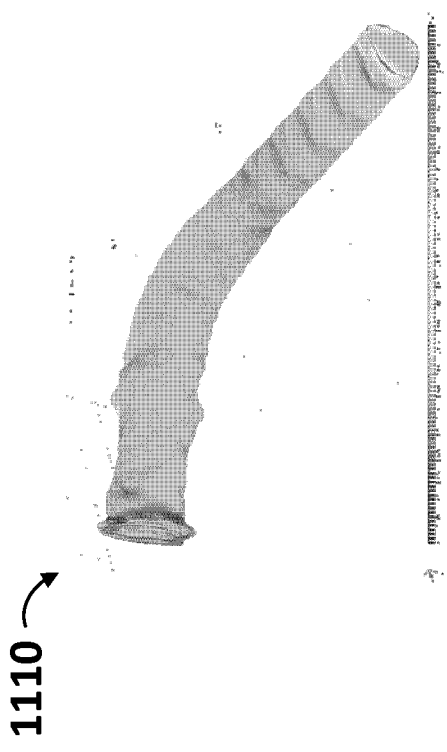
FIGS. 21B-21C are a wall pressure profile and a velocity profile, respectively, of the digital 3D CA model of FIG. 21A.
Figure 21C:
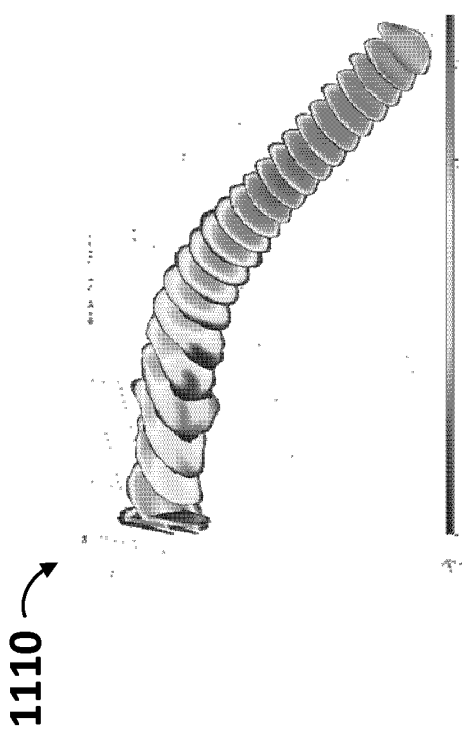

FIGS. 21A-C show the digital 3D model, the pressure profile, and the velocity profile of first CA model 1110 of a fourth patient at the 3-month time point. FIGS. 21D-F show the digital 3D model, the pressure profile, and the velocity profile of second CA model 1112 of the fourth patient at the 12-month time point.

Figure 22D:
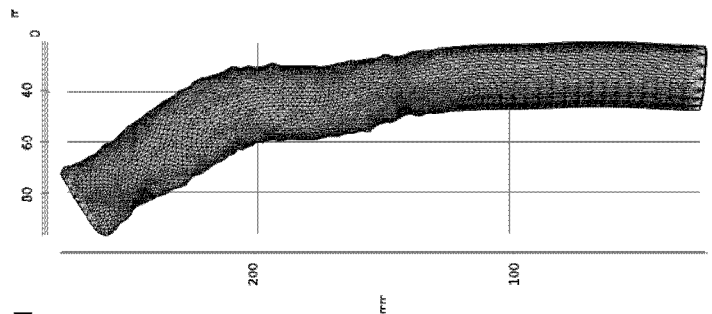
FIG. 22D is an example of a digital 3D CA model taken from the fifth patient at a second time.
Figure 22A:
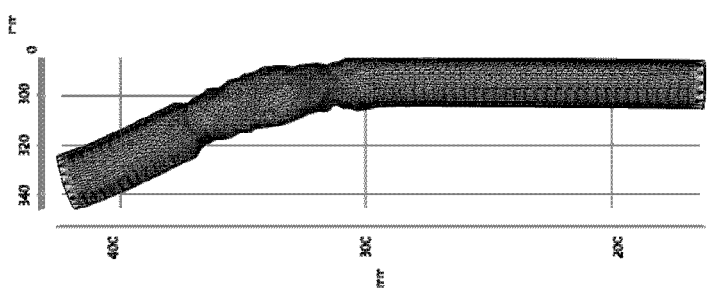
FIG. 22A is an example of a digital 3D CA model taken from a fifth patient at a first time.
Figure 22F:
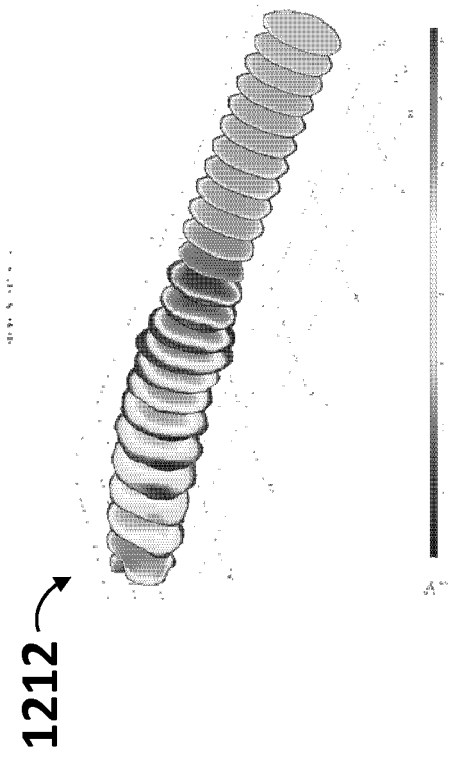
FIGS. 22E-22F are a wall pressure profile and a velocity profile, respectively, of the digital 3D CA model of FIG. 22D.
Figure 22E:
Figure 22C:
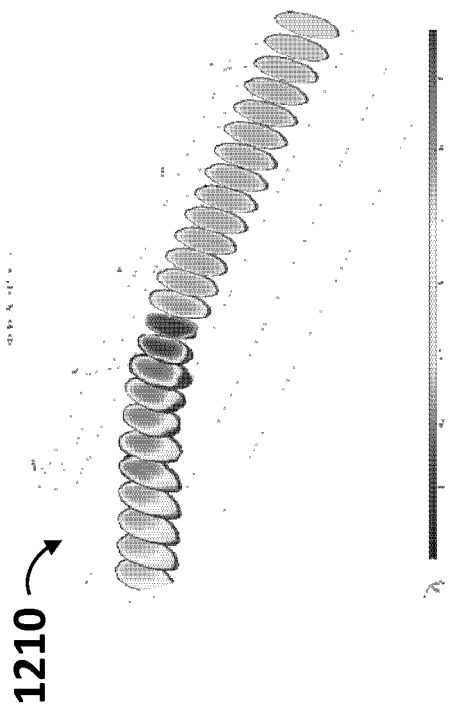
FIGS. 22B-22C are a wall pressure profile and a velocity profile, respectively, of the digital 3D CA model of FIG. 22A.
Figure 22B:
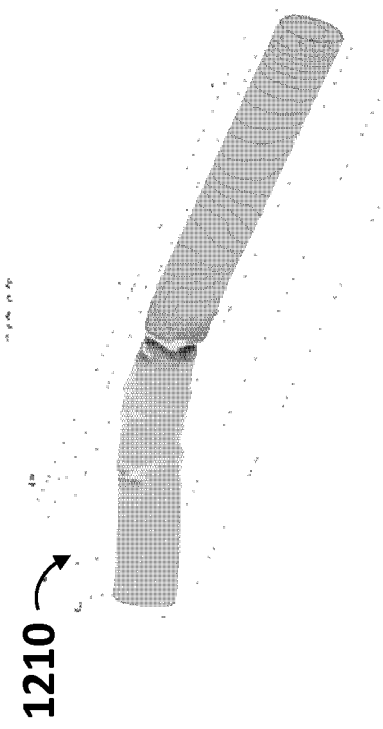

FIGS. 22A-C show the digital 3D model, the pressure profile, and the velocity profile of first CA model 1210 of a fifth patient at the 3-month time point. FIGS. 22D-F show the digital 3D model, the pressure profile, and the velocity profile of second CA model 1212 of the fifth patient at the 12-month time point.

As shown, vein geometry varies greatly between each individual patients. Vein diameter may be wider at the 12-month time point for some patients (812, 1212), while it may be narrower at the 12-month time point for other patients (1012). The change in vein geometry also significantly impacts the local velocity and pressure profiles of the cephalic arch. Because of the notable variations between flow parameters for each patient, a systematic approach to deceasing thrombosis and stenosis is likely to be ineffective. Using patient specific 3D CA models (digital and fabricated), will allow treatments to take individualized flow parameters at the cephalic arch (e.g., global Re and turbulence from high fluid flow velocities and large vein diameter, low WSS in inner bend as function of bend angle; localized low WSS and Re dependent on irregular geometry of the vein wall, or the like) to specifically tailor treatment that will best avoid the risks associated with specific patients.

These digital and fabricated 3D models represents a step towards understanding localized vein hemodynamics in a patient-specific manner. Not only are the cephalic arch's geometry and topology being faithfully replicated from each patient, but physiological parameters such as volumetric flow rate, pulsatility, blood viscosity and biochemical composition of each patient are captured as well during flow experiments. While the above examples are particularly enabling in understanding and treating AVF failure where the venous portion clots quite often in ESRD patients undergoing dialysis, this patient-specific vessel modeling, fabrication and experimental approach can be applied to other venous and arterial systems to better understand hemodynamics' influence on vascular diseases progression as well as patient-to-patient outcome variability. Overall, it is now possible to see the rheology undergoing inside a patient's vessel ex vivo on a chip The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A millifluidic Cephalic Arch (mCA) system comprising:
a millifluidic cephalic arch (mCA) device comprising:
a patient-specific vessel extending from a proximal end to a distal end, the vessel comprising:
an outer surface;

an inner surface defining a vessel lumen extending through the vessel from the proximal end to the distal end, the inner surface configured to correspond to a patient's Cephalic vein at a first predetermined time; and
a curved section that is nearer the vessel distal end than the vessel proximal end the curved section corresponding to a patient's Cephalic arch;
a fluid source configured to be in fluid communication with the mCA device to deliver fluid to the proximal end of the vessel; and
an control system comprising:
one or more sensors configured to detect a plurality of parameters of the inner surface of the vessel and the fluid flowing through the mCA device;
an imaging device configured to capture at least a portion of the inner surface while the fluid is flowing through the mCA device; and
a controller coupled to the one or more sensors and the imaging device, the controller configured to analyze the plurality of parameters.

2. The mCA system of claim 1, wherein the inner surface of the mCA device comprises endothelium.

3. The mCA system of claim 2, wherein the controller is configured to:
compare at least one of the plurality of parameters to a respective threshold value; and
based on the comparison, identify a first parameter associated an increased risk of thrombosis development.

4. The mCA system of claim 1, wherein in the imaging device is configured to provide intravascular ultrasound (IVUS), a venogram, or confocal microscopy of the mCA device.

5. The mCA system of claim 1, wherein the plurality of parameters comprise geometric parameters, homodynamic parameters, and endothelial parameters.

6. The mCA system of claim 5, wherein:
the geometric parameters comprise: a vessel lumen diameter, an angle of curved section, and length of vessel;
the homodynamic parameters comprise: physical properties of the fluid, pulsatility, fluid pressure, fluid flow rate, fluid velocity, Doppler flow velocity, Reynolds number, inner surface shear stress, and spatial identification of recirculation pools; and
the endothelial parameters comprise von Willebrand factor (VWF), P-selectin, cell viability, and nitric oxide levels.

7. The mCA system of claim 1, wherein the controller is configured analyze geometric, homodynamic, and endothelial parameters to determine a location of the inner surface with a higher risk of contributing to thrombosis.

8. The mCA system of claim 1, wherein the fluid comprises a blood-mimicking fluid (BMF) or blood.

9. The mCA system of claim 1, further comprising a second mCA device comprising:
a second patient-specific vessel extending from a second proximal end to a second distal end, the vessel comprising:
an second outer surface;
an second inner surface defining a second vessel lumen extending through the second vessel from the second proximal end to the second distal end, the second inner surface configured to correspond to the patient's Cephalic vein after second predetermined time; and
a second curved section that is nearer the second vessel distal end than the second vessel proximal end;
wherein the second patient-specific vessel corresponds to the patient's Cephalic vein after development of thrombosis.

10. A millifluidic cephalic arch (mCA) device comprising:
a patient-specific vessel extending from a proximal end to a distal end, the vessel comprising:
an inner surface defining a vessel lumen extending through the vessel from the proximal end to the distal end, the inner surface configured to correspond to a patient's Cephalic vein; and
a curved section that is nearer the vessel distal end than the vessel proximal end;
one or more sensors configured to detect geometric, homodynamic, or endothelial parameters associated with fluid flow within the vessel lumen; and
a controller coupled to the one or more sensors, the controller configured to analyze the geometric, homodynamic, or endothelial parameters to determine a location of the vessel lumen with a higher risk of contributing to thrombosis.

11. The mCA device of claim 10, wherein the inner surface of the mCA device comprises endothelium.

12. The mCA device of claim 11, wherein the endothelium comprises human umbilical vein endothelial cells.

13. The mCA device of claim 10, further comprising:
an inlet tube coupled to the proximal end of the vessel;
an outlet tube coupled to the distal end of the vessel; and
a fluid source coupled to the inlet tube and the outlet tube, the fluid source configured to supply a fluid from the proximal end to the distal end of the vessel lumen to define a flow path of the mCA device.

14. The mCA device of claim 13, wherein the fluid comprises a fluorescent material.

15. The mCA device of claim 10, wherein the vessel comprises an optically transparent polymer.

16. The mCA device of claim 10, wherein the inner surface is customized as a function of preoperative imaging of the patient's Cephalic vein.

17. The mCA device of claim 10, wherein the curved section defines an angle that is between 65 and 155 degrees.

18. The mCA device of claim 10, wherein the curved section defines a normalized radius of curvature that is between 1 and 15.

19. A method of forming a patient-specific mCA device, the method comprising:
preparing a three-dimensional venous cephalic arch model from patient-specific imaging data;
fabricating a three-dimensional cephalic arch mold; and
creating a predictive model for vein thrombosis for the cephalic arch model;
wherein:
the three-dimensional cephalic arch mold defines a venous conduit that corresponds to the three-dimensional venous cephalic arch model, and
the venous conduit includes an inlet and an outlet, the inlet configured to be coupled to a fluid source to deliver fluid through the venous conduit.

20. The method of claim 19, further comprising endothelializing the three-dimensional cephalic arch model.

* * * * *